(12) United States Patent
Salam et al.

(10) Patent No.: US 10,395,197 B1
(45) Date of Patent: Aug. 27, 2019

(54) TRANSPORTATION SYSTEM DISRUPTION MANAGEMENT APPARATUS AND METHODS

(71) Applicant: American Airlines, Inc., Fort Worth, TX (US)

(72) Inventors: Remi Salam, Irving, TX (US); Timothy Jon Niznik, Flower Mound, TX (US); Deepak Warrier, Euless, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 961 days.

(21) Appl. No.: 13/755,766

(22) Filed: Jan. 31, 2013

Related U.S. Application Data

(60) Provisional application No. 61/747,510, filed on Dec. 31, 2012.

(51) Int. Cl.
*G06Q 10/06* (2012.01)
*G06Q 10/08* (2012.01)

(52) U.S. Cl.
CPC ....... *G06Q 10/06314* (2013.01); *G06Q 10/08* (2013.01)

(58) Field of Classification Search
None
See application file for complete search history.

(56) References Cited

U.S. PATENT DOCUMENTS

| | | |
|---|---|---|
| 6,044,353 A | 3/2000 | Pugliese, III |
| 6,108,636 A | 8/2000 | Yap et al. |
| 6,161,097 A | 12/2000 | Glass et al. |
| 6,314,361 B1 | 11/2001 | Yu et al. |
| 6,393,359 B1 | 5/2002 | Flynn et al. |
| 6,408,276 B1 | 6/2002 | Yu et al. |
| 6,721,714 B1 | 4/2004 | Baiada et al. |
| 2002/0107714 A1 | 8/2002 | Whitlock et al. |
| 2002/0177943 A1 | 11/2002 | Beardsworth |

(Continued)

FOREIGN PATENT DOCUMENTS

WO WO 2008/061793 A1 5/2008

OTHER PUBLICATIONS

Arguello, Michael, et al., "A GRASP for Aircraft Routing in Response to Groundings and Delays" Journal of Combinatorial Optimization 5, 1997, pp. 211-228.

(Continued)

*Primary Examiner* — Eric W Stamber
*Assistant Examiner* — Ashley Y Young
(74) *Attorney, Agent, or Firm* — Haynes and Boone, LLP

(57) ABSTRACT

A system and method for receiving data associated with a plurality of travel legs; identifying a resources delay relating to a delay necessary to provide a travel leg from the plurality of travel legs with resources required for the departure of the travel leg, and an existing delay associated with the travel leg; determining a projected arrival delay and a projected departure delay based on the resources delay and the existing delay; outputting parameters relating to the projected arrival delay and the projected departure delay; receiving operation parameters; and generating a proposed operation plan using the projected arrival delay, the projected departure delay, and the operation parameters. In an exemplary embodiment, each of the travel legs is an airline flight.

9 Claims, 13 Drawing Sheets

(56) References Cited

U.S. PATENT DOCUMENTS

| | | |
|---|---|---|
| 2003/0050746 A1* | 3/2003 | Baiada .................. G08G 5/0043 |
| | | 701/3 |
| 2003/0139875 A1 | 7/2003 | Baiada et al. |
| 2003/0167109 A1 | 9/2003 | Clarke et al. |
| 2003/0225598 A1 | 12/2003 | Yu et al. |
| 2004/0054550 A1 | 3/2004 | Cole et al. |
| 2005/0192701 A1 | 9/2005 | Ben-Ezra |
| 2005/0216281 A1 | 9/2005 | Prior |
| 2005/0246224 A1 | 11/2005 | McKanna et al. |
| 2007/0043598 A1 | 2/2007 | Bertram et al. |
| 2007/0219833 A1 | 9/2007 | Trautman |
| 2009/0125357 A1 | 5/2009 | Vannette et al. |

OTHER PUBLICATIONS

Bailey, Jeff, "Airlines Work on Systems to Reduce Delays" The New York Times, Nov. 15, 2007, 4 pages, nytimes.com, N.Y., USA.

Eriksen, Peter, "Collaborative Decision Making Information Management in Airports" Eurocontrol Experimental Centre, Bretigny-sur-Ogre, France, from IEEE, 2002, 8 pages.

Fuhr, Brigitte, "Robust Flight Scheduling—An Analytic Approach to Performance Evaluation and Optimization", Clausthal University of Technology, Lufthansa Airlines, Apr. 23, 2007, 19 pages.

Schaefer, Andrew J. et al., "Improving Airline Operational Performance Through Schedule Perturbation" Department of Industrial Engineering, University of Pittsburgh, Pittsburgh, PA, Oct. 28, 2002, 12 pages.

Office Action dated Jun. 14, 2011 for U.S. Appl. No. 12/350,178.
Office Action dated Nov. 10, 2011 for U.S. Appl. No. 12/350,178.
Notice of Allowance dated Jun. 6, 2014 for U.S. Appl. No. 12/350,178.

\* cited by examiner

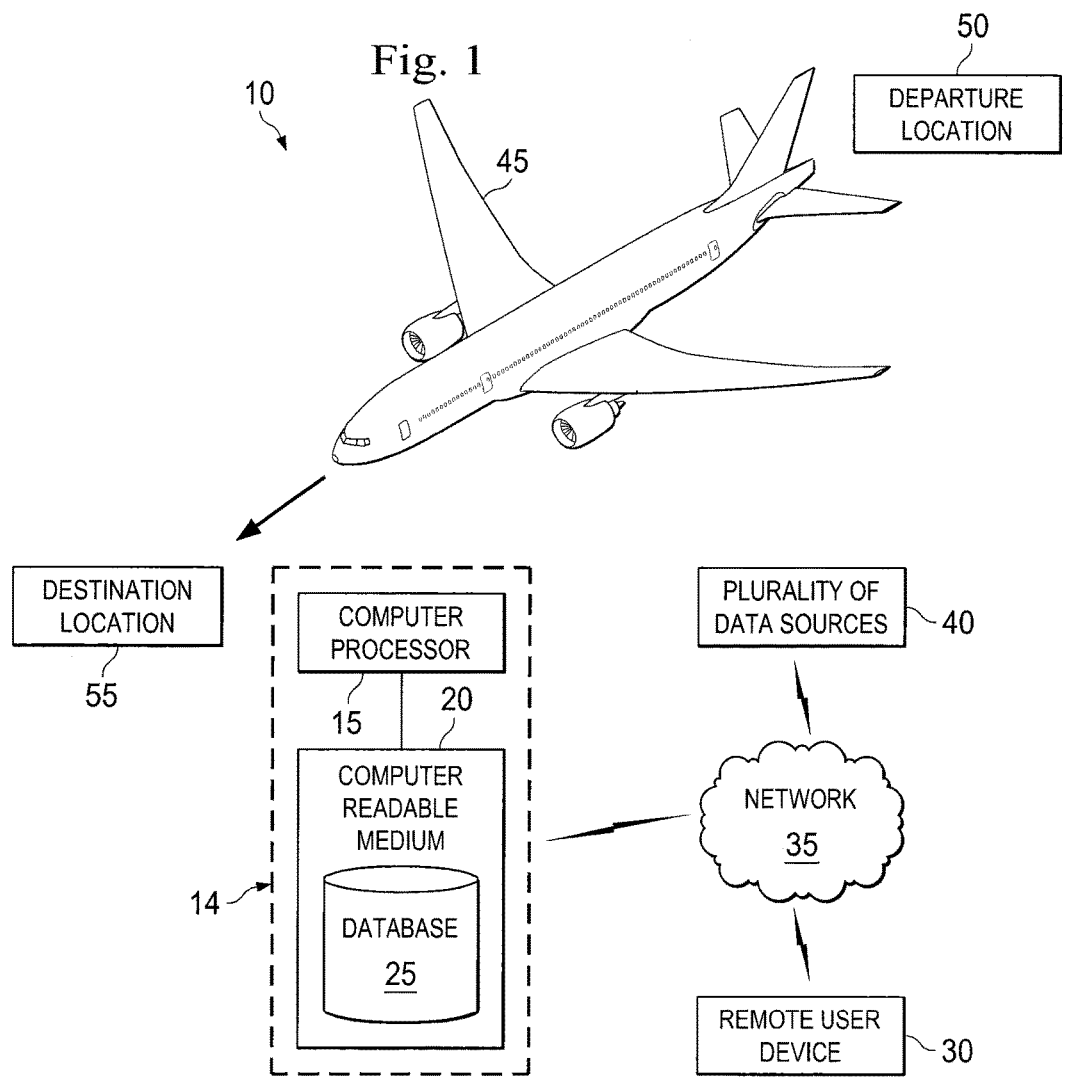

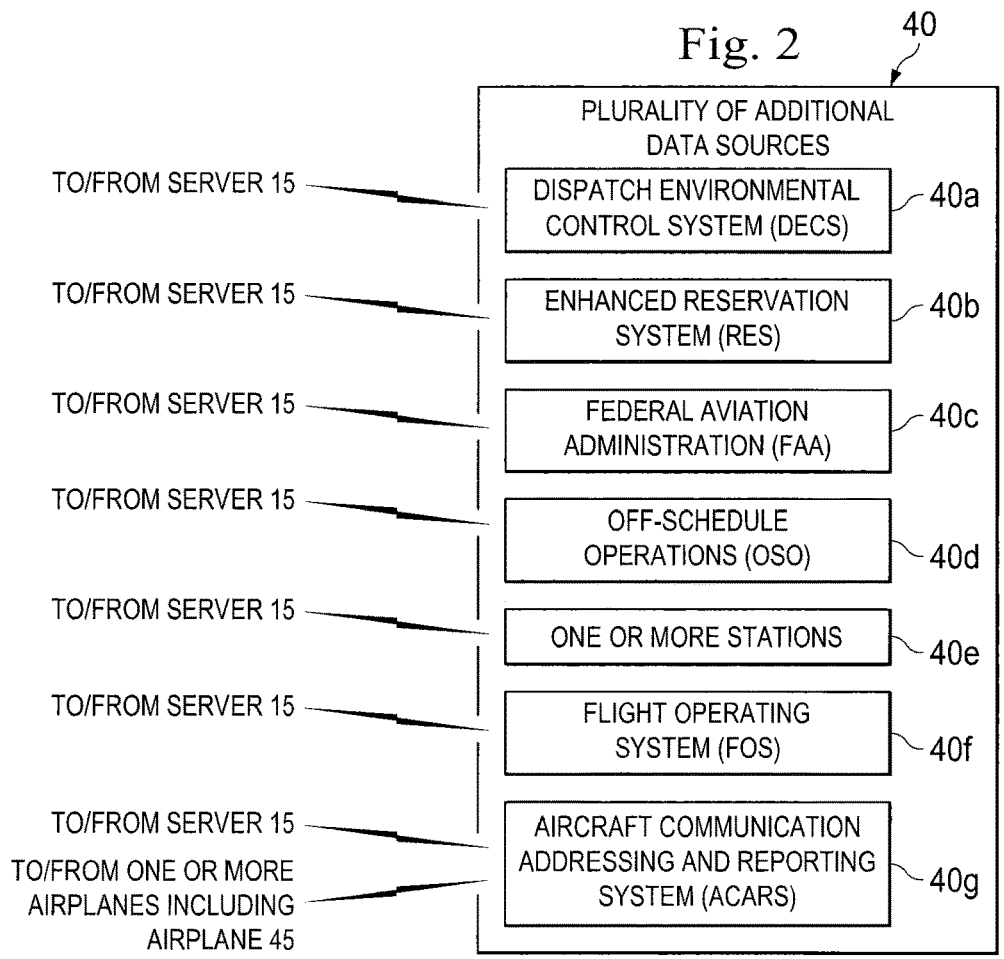
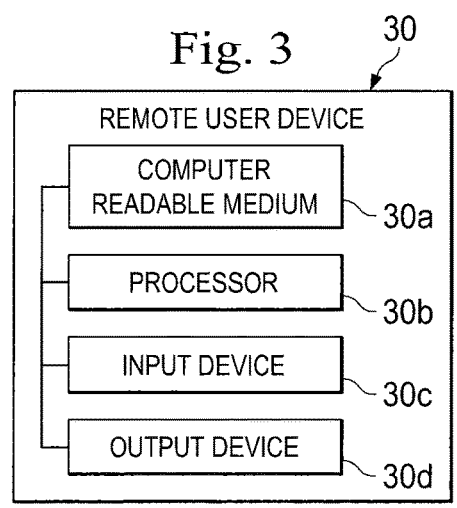

Fig. 5

| Select | FLT/DA | DPT | ARV | A/C | SKDD | ETD | PGTD |
|---|---|---|---|---|---|---|---|
| ☐ | 508/26 | MTY | DFW | 4WB | 0650 | 1550 | 1552 |
| ☐ | 1746/26 | GCM | MIA | 3AY | 0840 | 1700 | 1700 |
| ☐ | 402/26 | DFW | CLT | 462 | 1305 | 1544 | 1544 |
| ☐ | 1595/26 | CLT | DFW | 462 | 1715 | 1945 | 1951 |
| ☐ | 453/26 | DFW | PDX | 593 | 1310 | 1600 | 1625 |
| ☐ | 522/26 | PDX | DFW | 593 | 1600 | 1650 | 1847 |
| ☐ | 403/26 | DFW | TUS | 593 | 2245 | 2245 | 0112 |
| ☐ | 994/26 | PTY | MIA | 3AB | 1315 | 1553 | 1553 |
| ☐ | 1908/26 | PAP | MIA | 5EP | 1615 | 2003 | 2003 |
| ☐ | 1125/26 | MIA | LAX | 5EP | 2115 | 2115 | 0048 |
| ☐ | 1339/26 | ORD | SAN | 3DC | 2015 | 2015 | 2231 |

80a ← FLT/DA, 80b ← DPT, 80c ← ARV, 80d ← A/C, 80e ← SKDD, 80f ← ETD, 80g ← PGTD, 80 ← table

Fig. 10

DFW CAC Input

Select Scenario >> [DIVERSION RECOVERY ▼]

190 — ☑ Prevent Duty Day Violations  195 — ☑ Prevent Curfew Violations

Select Airline >> 200 — ☑ AA    ☐ MQ  200 — ☐ NA  200 — ☐ RP

Plan Response >> [Manual CAC ▼] — 185

AA

Input CAC Delay, Gate Capacity (at Local Time)

| SKD HOUR | 10 | 11 | 12 | 13 | 14 | 15 | 16 | 17 | 18 | 19 | 20 | 21 | 22 | 23 | 0 | 1 | 2 |
|---|---|---|---|---|---|---|---|---|---|---|---|---|---|---|---|---|---|
| GATE CAPACITY | 61 | 61 | 61 | 61 | 61 | 61 | 61 | 61 | 61 | 61 | 61 | 61 | 61 | 61 | 61 | 61 | 61 |
| CAC DELAY (mins) | 0 | 0 | 0 | 0 | 0 | 0 | 0 | 0 | 0 | 0 | 0 | 0 | 0 | 0 | 0 | 0 | 0 |

205a, 205b, 205c → 205

Advanced Settings

Set Additional Parameters:

Airport Closure  hhmm (in 24 hrs)  mm/dd
210 — [0100]  [03/23]

Departure Threshold: [45] Mins
215

MOGT Inflation: [0] Mins
220

Departure Delay Adjustment: [0] Mins
225

Exclude by Category

[INTL MARKETS (16/16)]  [DOM MARKETS (12/86)]  [REGIONS (3/9)]

[EQP TYPES (0/11)]  [EXTRA FLYING (REV) (0/0)]  [EXTRA FLYING (NON REV) (4/7)]

Exclude by Flight

[ARRIVALS (204/487)]  [DEPARTURES (REV) (147/489)]

Exclude by Default

[RESTORE DEFAULTS]

230

[Create Plan]

ETD Post Editor DFW Manual CAC 0

Post for airline: AA [240] (hrs)
post for the next [240] (mins) min delay to post threshold          Filter    Show All

DFW ManualCACbyhour Plan has been created                                              Total Flights: 270

| FLT | LEG | DEP STA | DEP STS | SGTD | LGTD | ARR | SGTA | Prj Delay | User CAC Delay | ETE Adj | Legality Adj | Adj CAC Delay | Total Delay To Post | Posting Status |
|---|---|---|---|---|---|---|---|---|---|---|---|---|---|---|
| 1884 |  | SJC | SKD | 08:50 | 08:50 | DFW | 14:15 |  | 60 | 3 |  | 63 | 63 |  |
| 0743 |  | LGA | ETD | 11:55 | 12:10 | DFW | 15:10 | 31 | 60 |  |  | 60 | 60 |  |
| 1841 |  | BOS | SKD | 11:55 | 11:55 | DFW | 15:15 |  | 60 | 16 |  | 76 | 76 |  |
| 1421 |  | MIA | SKD | 12:10 | 12:10 | DFW | 14:30 |  | 60 | 8 |  | 68 | 68 |  |
| 0357 |  | BDL | SKD | 12:10 | 12:10 | DFW | 15:15 | 2 | 60 | 24 |  | 84 | 84 |  |
| 2430 |  | LAX | SKD | 09:15 | 09:15 | DFW | 14:15 |  | 60 | -1 |  | 59 | 59 |  |
| 1543 |  | EWR | SKD | 12:15 | 12:15 | DFW | 15:20 |  | 60 | 35 |  | 95 | 95 |  |

(FLT DATA / Delay DATA)

Number of flights receiving CAC delay: 270
Number of arrivals receiving CAC delay: 126
Number of departures affected by CAC delay: 144
Minimum CAC delay: 16
Maximum CAC delay: 95
Earliest scheduled arrival receiving CAC delay: 14:05
Latest Scheduled arrival receiving CAC delay: 18:55
Earliest scheduled departure affected by CAC delay: 15:05
Latest scheduled departure affected by CAC delay: 19:55

[245]    Post ETD    Close

Fig. 12

DFW CAC Input

Select Scenario >> [DIVERSION RECOVERY ▼]
255 — ☑ Prevent Duty Day Violations   260 — ☑ Prevent Curfew Violations
Select Airline >>   265 ☑ AA   ☐ MQ   265 ☐ NA   265 ☐ RP
Plan Response >> [Auto CAC ▼] — 185

— 250

Advanced Settings

AA

Input Gate Capacity (at Local Time)

| SKD HOUR | 10 | 11 | 12 | 13 | 14 | 15 | 16 | 17 | 18 | 19 | 20 | 21 | 22 | 23 | 0 | 1 | 2 |
|---|---|---|---|---|---|---|---|---|---|---|---|---|---|---|---|---|---|
| GATE CAPACITY | 55 | 55 | 55 | 55 | 38 | 38 | 38 | 38 | 55 | 55 | 55 | 55 | 55 | 55 | 55 | 55 | 55 |
| DIV. METERING | 0 | 0 | 0 | 0 | 0 | 0 | 0 | 0 | 0 | 0 | 0 | 0 | 0 | 0 | 0 | 0 | 0 |

270a
270b  } 270
270c

Set Additional Parameters:

Airport Closure hhmm (in 24 hrs)  mm/dd
275 — [0100]  [03/23]

Departure Threshold:  [45] Mins
280

MOGT Inflation:  [0] Mins
285

Maximum Addition Delay:  [120]
290

Exclude by Category

[INTL MARKETS (16/16)]  [DOM MARKETS (12/86)]  [REGIONS (3/9)]

[EQP TYPES (0/11)]  [EXTRA FLYING (REV) (0/0)]  [EXTRA FLYING (NON REV) (4/7)]

Exclude by Flight

[ARRIVALS (204/487)]  [DEPARTURES (REV) (147/489)]

295

Exclude by Default

[RESTORE DEFAULTS]

[Create Plan]

TRANSPORTATION SYSTEM DISRUPTION MANAGEMENT APPARATUS AND METHODS

CROSS-REFERENCE TO RELATED APPLICATION

This application claims the benefit of the filing date of U.S. Application No. 61/747,510, filed Dec. 31, 2012, the entire disclosure of which is incorporated herein by reference.

BACKGROUND

The present disclosure relates in general to a system and method for managing disruptions within a transportation system such as, for example, air, land or sea transportation systems, and in particular to a system and method for managing disruptions using intentional impositions of delays on one or more vehicles that arrive at, and depart from, one or more specific locations, such as, for example, operations during which multiple airplanes arrive at, and depart from, multiple airport gates at multiple airports.

BRIEF DESCRIPTION OF THE DRAWINGS

FIG. 1 is a diagrammatic illustration of a system according to an exemplary embodiment, the system including a plurality of data sources and a remote user device.

FIG. 2 is a diagrammatic illustration of the plurality of data sources of FIG. 1, according to an exemplary embodiment.

FIG. 3 is a diagrammatic illustration of the remote user device of FIG. 1, according to an exemplary embodiment.

FIGS. 5-8 are diagrammatic illustrations of parameters referenced in FIG. 4, according to an exemplary embodiment.

FIG. 10 is a diagrammatic illustration of a user interface of the remote user device of FIG. 3, according to an exemplary embodiment.

FIG. 11 is a diagrammatic illustration of a proposed plan parameter referenced in FIG. 9B, according to an exemplary embodiment.

FIG. 12 is a diagrammatic illustration of a user interface of the remote user device of FIG. 3, according to an exemplary embodiment.

DETAILED DESCRIPTION

Figure 4:
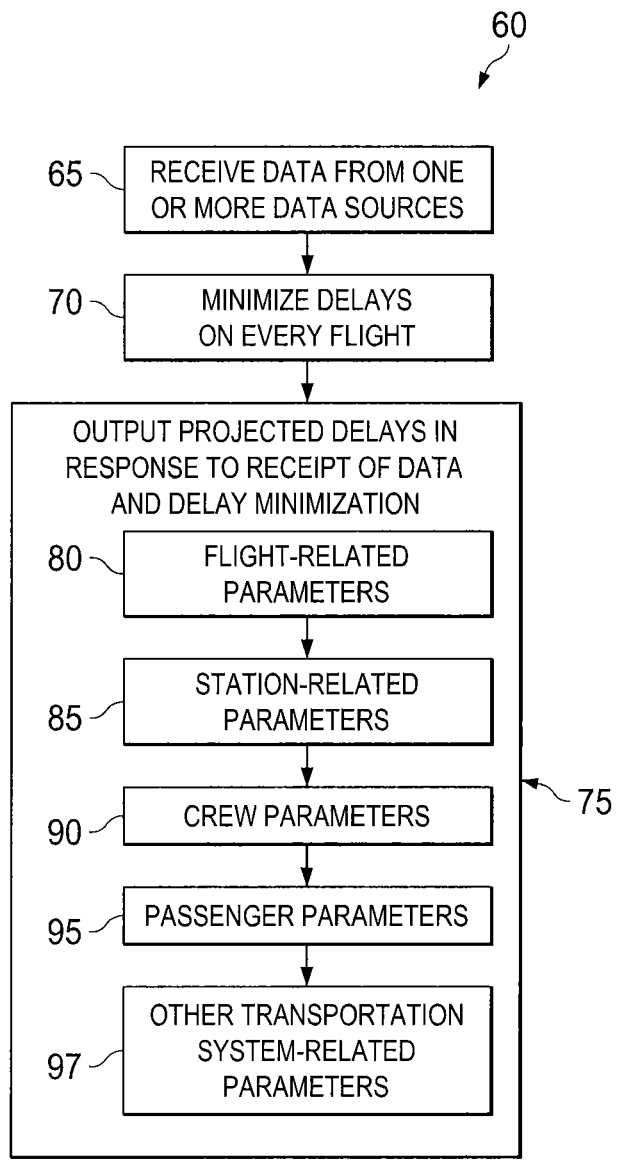
FIG. 4 is a flow chart illustration of a method of operating the system of FIG. 1, according to an exemplary embodiment.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an exemplary embodiment, as illustrated in FIG. 1, a system is generally referred to by the reference numeral 10 and includes a functional module 14, which includes a computer processor 15 and a computer readable medium 20 operably coupled thereto. Instructions accessible to, and executable by, the computer processor 15 are stored on the computer readable medium 20. A database 25 is also stored in the computer readable medium 20. A remote user device 30 is operably coupled to, and in communication with, the functional module 14 and a plurality of data sources 40 via a network 35. In one embodiment, the plurality of data sources 40 receives data relating to transportation systems. In one embodiment, the plurality of data sources 40 receives data relating to flight operations. In one embodiment, the plurality of data sources 40 receives data relating to a flight from a plurality of flights, the flight using an airplane 45 and having a departure location 50 and a destination location 55. Severe weather at the destination location 55 can result in ramp closures, extensive air traffic control delays, and flight diversions at the destination location 55 that result in major disruptions to a flight schedule associated with the airplane 45. In several embodiments, by receiving transportation-related data from the plurality of data sources 40, the system 10, using a monitor mode, may anticipate delays from operational irregularities, such as impending gate congestion, misconnecting customers, or flight cancellations, before they actually occur by propagating existing flight delays and anticipating the effect of each flight's delay on any other flight. In one embodiment, the transportation-related data is flight operations related data. These anticipated delays can be displayed on the remote user device 30. In one embodiment, the system 10 may receive data from a user through the remote user device 30; receive data from a plurality of data sources 40; create strategic delays of flights to manage reduced airport capacity, prevent customer misconnects, satisfy operational constraints; and display these results by outputting plan parameters on the remote user device 30, using a recovery mode. In one embodiment, the system 10 may receive data from a user through the remote user device 30; receive data from a plurality of data sources; propagate existing flight delays and anticipate the effect of each flight's delay on every other flight; create strategic delays, or intentionally implemented delays, of flights to manage reduced airport capacity, prevent customer misconnects, and satisfy operational constraints; and display these results by outputting plan parameters on the remote user device 30, using the recovery mode. In several embodiments, the recovery mode is implemented to minimize delays, specifically related to gate congestion, when there is a change in demand of resource or a change in resources. In one embodiment, implementing intentional delays on flights or cancellations of flights will reduce gate congestion and tarmac delays. In one embodiment, the creation of strategic delays of flights or cancellations of flights, within the recovery mode, may be based on a manual operation mode or an automatic operation mode. Using a manual operation mode, the user may customize a proposed manual operation plan by inputting a user-specified delay on a flight. Using the automatic system mode, the user does not input a user-specified delay on a flight.

In an exemplary embodiment, the functional module 14 is a web application server, which in several exemplary embodiments includes and/or executes one or more web-based programs, Intranet-based programs, and/or any combination thereof. In an exemplary embodiment, the network 35 includes the Internet, one or more local area networks, one or more wide area networks, one or more cellular networks, one or more wireless networks, one or more voice networks, one or more data networks, one or more communication systems, and/or any combination thereof.

In an exemplary embodiment, as illustrated in FIG. 2 with continuing reference to FIG. 1, the plurality of additional data sources 40 includes a dispatch environmental control system (DECS) 40$a$ and/or one or more computer systems, host-based systems and/or applications thereof; an enhanced reservation system (RES) 40$b$ and/or one or more computer systems, host-based systems and/or applications thereof; the Federal Aviation Administration (FAA) 40$c$ and/or one or more computer systems, host-based systems and/or applications thereof; off-schedule operations (OSO) 40$d$ and/or one or more computer systems, host-based systems and/or applications thereof; one or more stations 40$e$ such as, for example, a station at the departure location 50 and/or a station at the destination location 55, and/or one or more computer systems, host-based systems and/or applications thereof; a flight operating system (FOS) and/or one or more computer systems, host-based systems and/or applications thereof, and an aircraft communication addressing and reporting system (ACARS) 40$g$ and/or one or more computer systems, host-based systems and/or applications thereof.

In an exemplary embodiment, as illustrated in FIG. 3 with continuing reference to FIG. 1, the remote user device 30 includes a computer readable medium 30$a$, a processor 30$b$, an input device 30$c$, and an output device 30$d$. In an exemplary embodiment, instructions accessible to, and executable by, the processor 30$b$ are stored in the computer readable medium 30$a$. In an exemplary embodiment, web browser software is stored in the computer readable medium 30$a$. In an exemplary embodiment, the input device 30$c$ and the output device 30$d$ include a graphical display, which, in several exemplary embodiments, is in the form of, or includes, one or more digital displays, one or more liquid crystal displays, one or more cathode ray tube monitors, and/or any combination thereof. In an exemplary embodiment, the output device 30$d$ includes a graphical display, a printer, a plotter, and/or any combination thereof. In an exemplary embodiment, the input device 30$c$ is the output device 30$d$, and the output device 30$d$ is the input device 30$c$.

In several exemplary embodiments, the remote user device 30 is a thin client and the functional module 14 controls at least a portion of the operation of the remote user device 30. In several exemplary embodiments, the remote user device 30 is a thick client. In several exemplary embodiments, the remote user device 30 functions as both a thin client and a thick client. In several exemplary embodiments, the remote user device 30 is, or includes, a telephone, a personal computer, a personal digital assistant, a cellular telephone, other types of telecommunications devices, other types of computing devices, and/or any combination thereof. In several exemplary embodiments, the remote user device 30 includes a plurality of remote user devices. In several exemplary embodiments, the remote user device 30 is, or at least includes, one or more of the functional module 14, the computer processor 15, the computer readable medium 20, the database 25 and/or any combination thereof.

In an exemplary embodiment, the system 10 includes a computer program including a plurality of instructions, data, and/or any combination thereof. In an exemplary embodiment, the system 10 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the system 10 is a web-based application written in, for example, Java or Adobe Flex, which pulls real-time information from the remote user device 30, the functional module 14, and/or the plurality of additional data sources 40. In an exemplary embodiment, the system 10 pulls real-time information from the remote user device 30, the functional module 14, and/or the plurality of additional data sources 40, upon the execution, opening or start-up of the system 10. In an exemplary embodiment, the system 10 is a web-based application written in, for example, Java or Adobe Flex, which pulls real-time information from the remote user device 30, the functional module 14, and/or the plurality of additional data sources 40, automatically refreshing with latest information every, for example, 45 seconds.

In an exemplary embodiment, as illustrated in FIG. 4 with continuing reference to FIGS. 1-3, a method of managing disruptions within a transportation system, by operating the system 10, is generally referred to by the reference numeral 60. In an exemplary embodiment, the transportation system is a plurality of airline flights, each of which departs from a station at a departure location and arrives at a station at an arrival location. In several exemplary embodiments, the method 60 is implemented by, or at least partially implemented by, the functional module 14 of the system 10. In one embodiment, the method 60 includes receiving data from the plurality of data sources 40 in step 65, determining projected delays by minimizing delays on every flight in step 70, and outputting projected delays in the step 75. In one embodiment, the method 60 is associated with using the monitor mode of the system 10. In an exemplary embodiment, while in the monitor mode, the system 10 monitors for operational irregularities, such as long gate or taxi delays, crew duty and/or layover violations, airport curfew violations, gate congestion, and/or passenger misconnects. The system 10 can monitor not only one airport or station, but can monitor an entire transportation system, which includes a plurality of stations.

In an exemplary embodiment, at the step 65, the functional module 14 receives and stores data in the database 25, with the data—such as flight schedule, crew sequences, aircraft routings, passenger connections, crew duty and layover data, curfew data, and gate capacity—being received from one or more of the following: the remote user device 30; the DECS 40$a$; the RES 40$b$; the FAA 40$c$; the OSO 40$d$; the one or more stations 40$e$; the FOS 40$f$; and the ACARS 40$g$. In several embodiments, the types of data received in the step 65 include, but are not limited to, flight-related data, station-related data, crew data, passenger data, and other transportation system related data. An airline flight is a type of travel leg.

Before, during or after the step 65, the system 10 determines projected delays by minimizing a projected departure delay and a projected arrival delay for each flight at the step 70. In one embodiment, the system 10 ensures that a projected arrival delay or a projected departure delay allocated to each flight is not more than the greater of 1) late arriving required resources, such as crew and aircraft, and 2) existing delays on the flight, such as published delays or ATC imposed delays. In one embodiment, the system 10 uses a mixed-integer program, with parameters that can be described as follows:

F is a set of all flights for an airline for a predefined time period, typically a day; f∈F;

A is a set of arrival flights 'a' arriving at a station of interest; a∈A⊆F;

D is a set of departure flights 'd' departing from a station of interest; d∈D⊆F;

M is a set of all markets 'm' (origin-destination pairs); m∈M;

$F^m$ is a set of flights 'f' which are in the same market 'm';

C is a set of passenger connections 'c' where c=(g, f) where 'g' is the first leg of a passenger connection and 'f' is the second leg;

$P^f$ is a set of dependencies p=(g,f) where 'g' is a flight that feeds a particular resource (crew or aircraft) to a flight 'f'; note that g∈F and f∈F;

$FLT_a$ is a flight time for an arrival flight a; a∈A;

$LTA_a$ is a Latest time of arrival for the arrival flight a (a∈A) by which time the flight has to be at an arrival gate to avoid any crew violations;

$LTA_d$ is a Latest time of arrival for departure flight d (d∈D) by which time the flight has to be at the arrival gate to avoid any crew violations;

$ERTD_a/ERTA_a$ is a Earliest Runway Time of Departure/Arrival of the arrival flight a; a∈A;

$ERTD_d/ERTA_d$ is a Earliest Runway Time of Departure/Arrival of the departure flight d; d∈D;

$T_p$ is a turn time associated with dependency 'p' where p∈$P^f$, f∈F;

$T_c$ is a connect time for passengers in connection c∈C;

$\hat{x}_f$ is a scheduled arrival time of the flight 'f';

$x_f^L$ is an earliest time that the flight 'f' can arrive on account of an ATC delay;

$x_f^P$ is a published time that the flight 'f' will arrive;

$x_f^{LB}$ is the earliest time that a the flight 'f' can arrive;

$\hat{y}_f$ is a scheduled departure time of the flight 'f';

$y_f^L$ is an earliest time that the flight 'f' can depart on account of an ATC delay;

$y_f^P$ is a published time that the flight 'f' will depart;

$y_f^{LB}$ is an earliest time that a the flight 'f' can depart;

N is a total number of time intervals during the day of operation;

$s^i$ is starting times of time interval i=1 ... N+1;

I is an interval length of any time interval (note that each time interval is of the same length);

ε is a small fraction of I, this is required for computational purposes;

$Q^i$ is a number of available gates at time interval i=1 ... N+1;

$w_c$ is a weight for connection C∈C, e.g., number of passengers in connection c∈C;

$\overline{C}$ is a penalty for over utilization of a gate;

$P_f^a$ is a user-specified arrival delay on the flight f, f∈F;

$P_f^d$ is a user-specified departure delay on the flight f, f∈F;

$x_f$ is an arrival time of the flight f∈F;

$y_f$ is a departure time of the flight f∈F;

$w_f^a$ is an arrival delay on the flight 'f' beyond scheduled arrival time;

$w_f^d$ is a departure delay on the flight 'f' beyond scheduled departure time;

$z_c$ is 1 if the passengers on connection 'c' misconnect, c∈C, 0 otherwise;

$u_a^i$ is 1 if the arrival flight a∈A arrives at a time interval i, 0 otherwise;

$f_a$ is a time until arrival time of the arrival flight a∈A after the starting time of associated time interval;

$v_d^i$ is 1 if the departure flight d∈D departs at the time interval i, 0 otherwise;

$h_d$ is a time until departure time of the departure flight d∈D after the starting time of associated time interval;

$δ^i$ is an over-utilization of gates at the time interval i (surplus variable); and $λ^i$ is an under-utilization of the gates at the time interval i (slack variable).

In several embodiments, the mixed-integer program parameters, as described above, are used consistently throughout the system 10.

In an exemplary embodiment, the mixed-integer program parameters can be received from the functional module 14, the remote user device 30, and/or the plurality of data sources 40. As noted above, the system 10 uses a mixed-integer program to determine the projected arrival delays and the projected departure delays. In an exemplary embodiment, using the foregoing mixed-integer parameters, the mixed-integer program used at the step 70 can be mathematically written as follows:

Minimize $$\sum_{f\in F} w_f^a + \sum_{f\in F} w_f^d \quad (1)$$

Subject to:

$$y_f - x_g \geq T_p, \; \forall f\in F, \; p=(g,f)\in P^f \quad (2)$$

$$x_{f_1} - x_{f_2} \geq 0, \; \forall m, (f_1,f_2)\in \{\hat{x}_{f_1} \geq \hat{x}_{f_2}, f_1, f_2 \in F^m\} \quad (3)$$

$$x_f^{LB} \leq x_f \; \forall f\in F \quad (4)$$

$$x_f^{LB} \leq y_f \; \forall f\in F \quad (5)$$

$$x_f^d = y_f - \hat{y}_f \; \forall f\in F \quad (6)$$

$$w_f^a = x_f - \hat{x}_f \; \forall f\in F \quad (7)$$

In several exemplary embodiments, the objective of function (1) is to minimize a departure delay and an arrival delay on each flight. Constraint set (2) ensures that a flight is not allowed to depart until all required resources required to operate the flight (crew and aircraft) are available or "ready" (arrived and ready to operate the flight). Constraint set (3) ensures that in every market (Origin-Destination combination), the arrival order of any two flights in that market is the same as the scheduled order of those two flights. That is, the arrival order is preserved or not changed. Constraint set (4) ensures that an arrival time of each flight is greater than an allowable arrival lower bound. The arrival lower bound is determined as the maximum of ($\hat{x}_f$, $x_f^L$, $x_f^P$). That is, the arrival lower bound is the maximum of: a scheduled arrival time of each flight, the earliest time that each flight can arrive on account of an ATC delay, and the published time that each flight will arrive. Constraint set (5) ensures that a departure time of each flight is greater than an allowable departure lower bound. The lower departure bound is determined as the maximum of ($\hat{y}_f$, $y_f^L$, $y_f^P$). That is, the lower departure bound is the maximum of: a scheduled departure time of each flight, an earliest time that each flight can depart, and a published time that each flight will depart. Constraint set (6) computes a projected departure delay for each flight, the projected departure delay being the difference between the projected departure time and a scheduled departure time. Constraint set (7) computes a projected arrival delay for each flight, the projected arrival delay being the difference between the projected arrival delay and the scheduled arrival delay. Before, during or after the step 70, the system 10 outputs projected delays. In one embodiment, the system 10 can output the projected delays associated with one station, a station of interest, or can output the projected delays associated with the transportation system. In one embodiment, the system 10 outputs the projected delays in the step 75 by displaying the parameters using the remote user device 30. The step 75 includes outputting flight-related parameters 80, station-related parameters 85, crew parameters 90, passenger parameters 95, and other transportation system-related parameters 97. The remote user device 30 may function as a graphical terminal or thin client, graphically conveying the results of the processing activities of the functional module 14 via the output device 30d. By outputting the projected delays at the step 75, a user may identify and/or prevent disruptions and delays from occurring by preventing gate congestion and preserving passenger flows or flow.

In an exemplary embodiment, to output the projected delays in the step 75, a program such as, for example, a web browser, is executed by the processor 30b of the remote user device 30a, thereby causing the web browser to access a website hosted by the functional module 14, which website provides access to, and graphically communicates, the data stored in the database 25. As a result, in the step 75, the projected delays are outputted to the output device 30d of the remote user device 30. In some embodiments, only one parameter from parameters 80, 85, 90, 95 and 97 will be displayed on the output device 30d. In an exemplary embodiment, the output device 30d includes a graphical display such as a monitor, and the parameters are displayed on the graphical display in the step 75.

In an exemplary embodiment, as illustrated in FIG. 5, with continuing reference to FIGS. 1-4, during the step 75, the flight-related parameters 80 are displayed or otherwise outputted. The flight-related parameters include one or more rows of data parameter fields that that are associated with flights, particularly delayed flights. Each of the rows contains data header fields related to delayed flights, such as of FLT/DA corresponding to a flight number and a decision altitude, DPT corresponding to a departure location, ARV corresponding to an arrival location, A/C corresponding to aircraft carrier, SKDD corresponding to a scheduled departure time, ETD corresponding to an estimated time of departure, and PGTD corresponding to a projected gate departure. Each data header field in each row labels and/or describes the content of a respective data parameter field in columns 80a, 80b, 80c, 80d, 80e, 80f, and 80g.

Figure 6A:
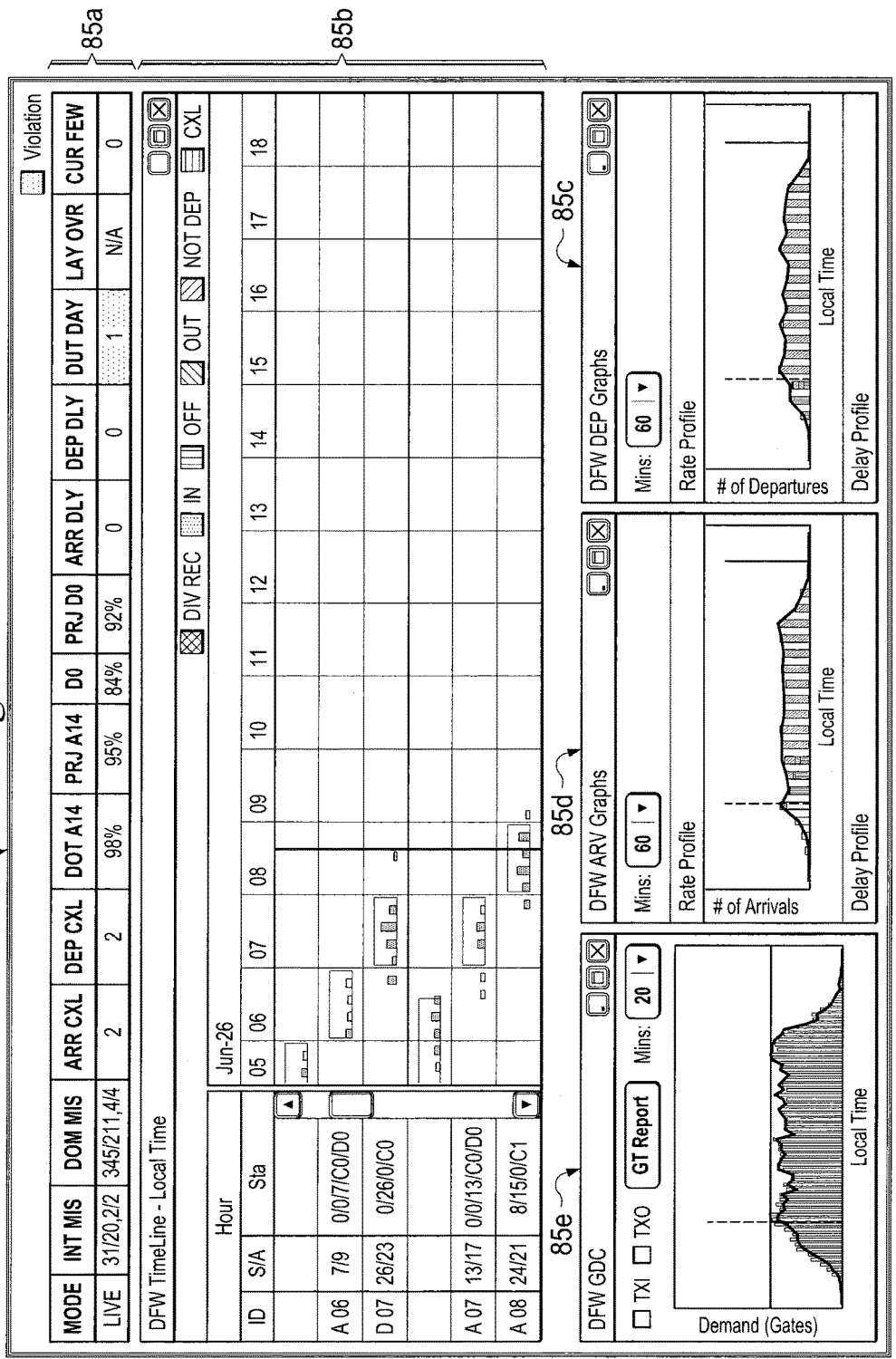

In an exemplary embodiment, as illustrated in FIG. 6A, with continuing reference to FIGS. 1-4, during the step 75, station-related parameters 85 are displayed or otherwise outputted. The station-related parameters include station statistics 85a for a station of interest, a graph of a station timeline 85b, a station departure chart 85c, a station arrival chart 85d, and a station gate demand chart 85e. In one embodiment, the station statistics 85a report passenger misconnects and crew and curfew alerts across all flights at the station of interest. In one embodiment, each statistic displayed may be selected by the user to view further details regarding that specific statistic. For example, selecting "DEP CXL" in the station timeline 85b will allow the user to view data parameters relating to all departure cancellations. In one embodiment, the station timeline 85b detects and highlights any fracture in the schedule by overlaying the projected arrival/departure times of flights with corresponding schedule times, thereby displaying the amount of deviation from scheduled operation at the station of interest. In one embodiment, the station departure chart 85c provides the user with an hourly departure rate, an average departure delay, and a median departure delay. In one embodiment, the station arrival chart 85d provides the user with an hourly arrival rate, an average arrival delay, and a median arrival delay. In one embodiment, the station gate demand chart 85e provides the user with the projected demand for gates at the station of interest.

Figure 6B:
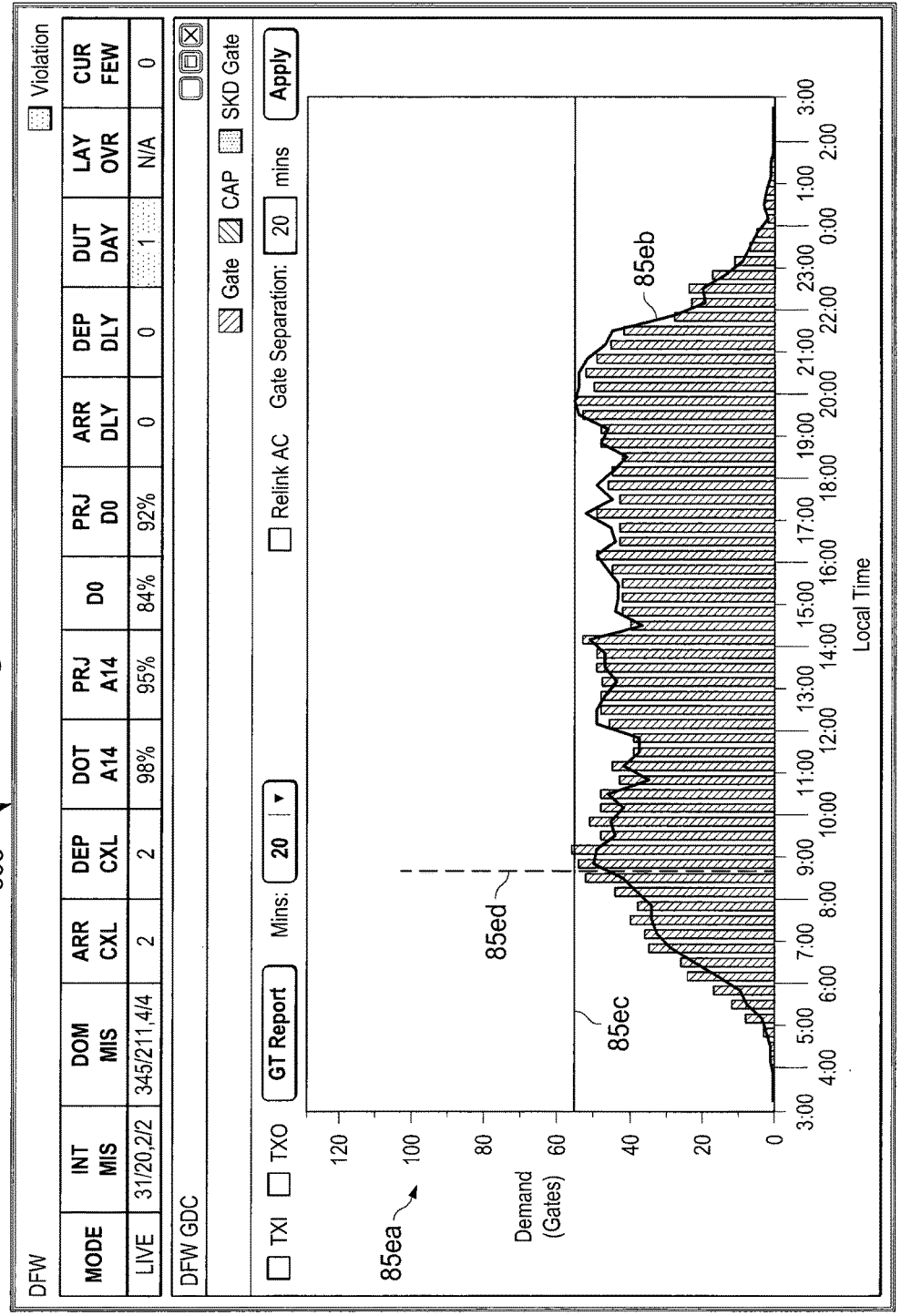

In an exemplary embodiment, as illustrated in FIG. 6B, with continued reference to FIGS. 1-4, the station gate demand chart 85e of FIG. 6A is enlarged to show a plurality of vertical lines 85ea that represent the projected demand for gates throughout a day. The width of each vertical line from the plurality of vertical lines 85ea represents a time period and the height of each vertical line from the plurality of vertical lines 85ea represents the total projected demand for gates in that time period and is based on the projected delays of each flight. A line 85eb represents the scheduled demand for gates throughout a day. A line 85ec represents the physical number of gates available at the stations. A vertical line 85ed represents the current time.

Figure 6C:
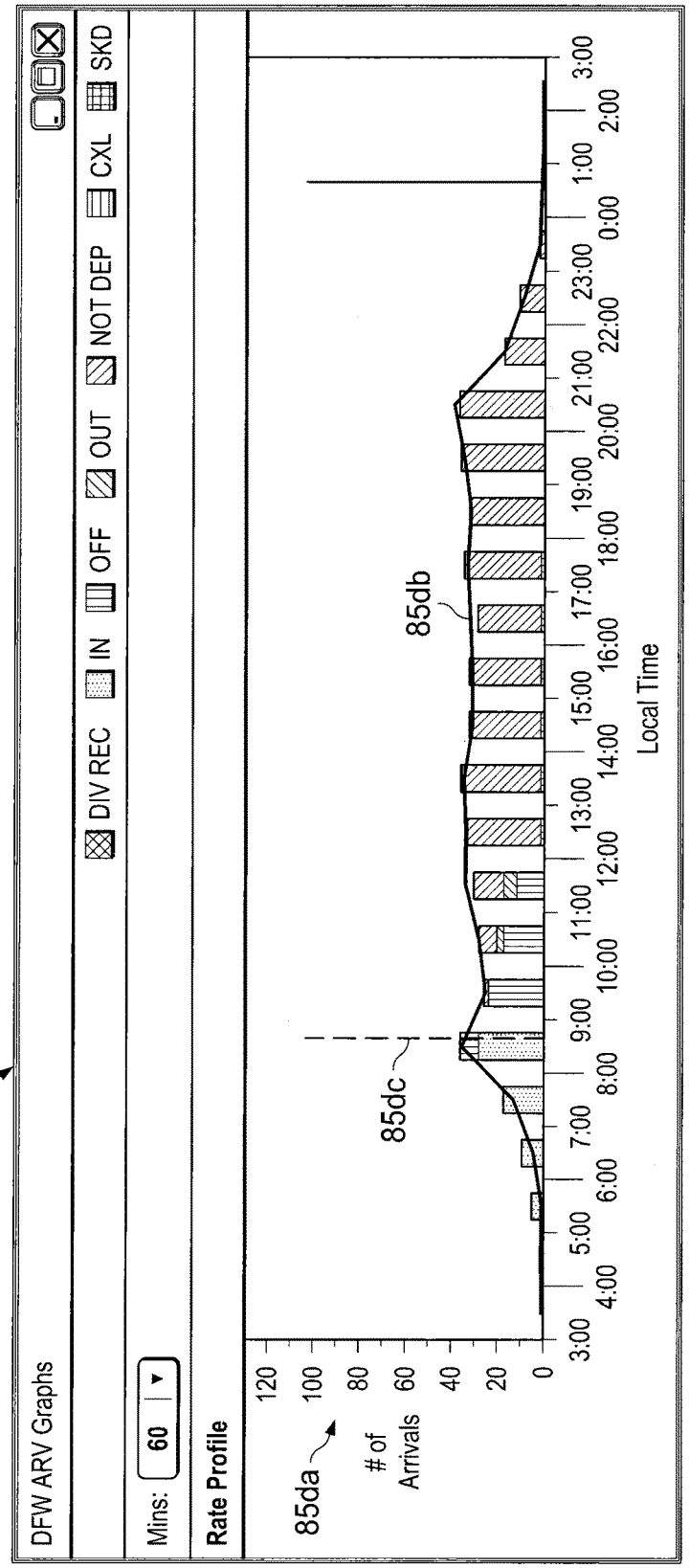

In an exemplary embodiment, as illustrated in FIG. 6C, with continued reference to FIGS. 1-4, the station arrival graph 85d of FIG. 6 is enlarged to show a plurality of vertical lines 85da that represent the total number of arrivals projected to arrive at a gate throughout the day. A line 85db represents the total scheduled number of arrivals at a gate through the day. A line 85dc represents the current time.

Figure 6D:
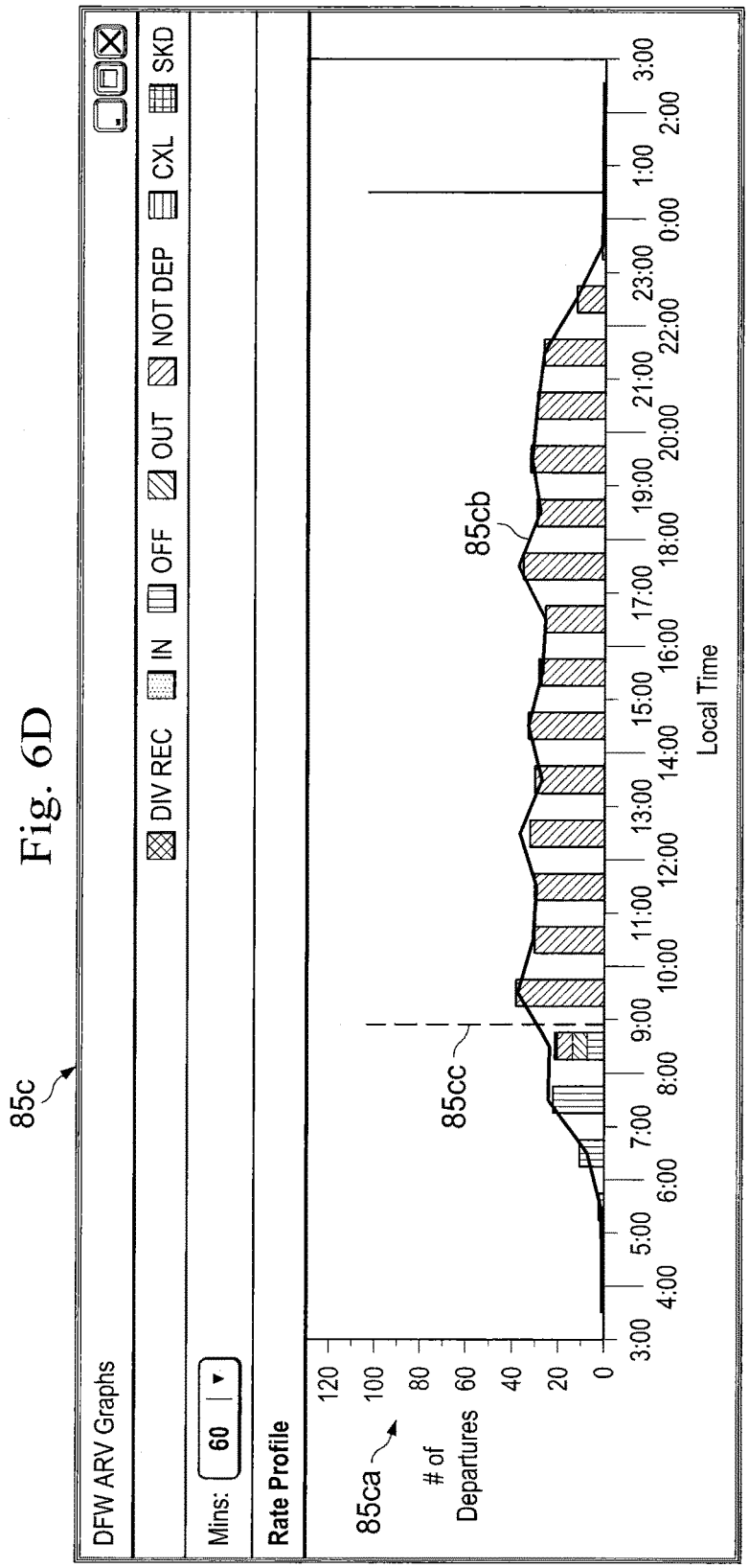

In an exemplary embodiment, as illustrated in FIG. 6D, with continued reference to FIGS. 1-4, the station departure graph 85c of FIG. 6 is enlarged to show a plurality of vertical lines 85ca that represent the total number of departures projected to depart from a gate throughout the day. A line 85cb represents the total scheduled number of departures from a gate through the day. A line 85cc represents the current time.

Figure 7:
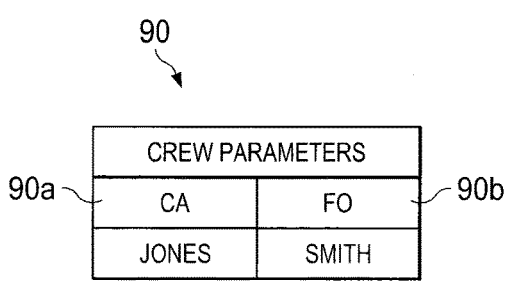

In an exemplary embodiment, as illustrated in FIG. 7, with continuing reference to FIGS. 1-4, during the step 75, crew related parameters 90 are output, which includes captain 90a and first officer 90b information, among others.

Figure 8:
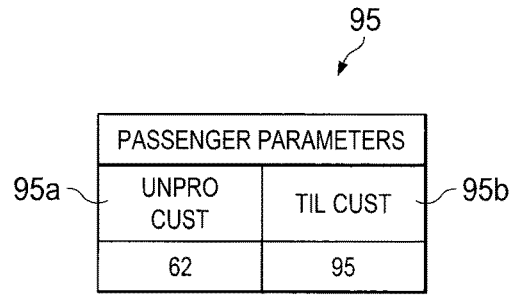

In an exemplary embodiment, as illustrated in FIG. 8, with continuing reference to FIGS. 1-4, during the step 75, passenger related parameters 95 are output, which includes parameters relating to unprotected customers 95a and another class of customers 95b.

Figure 9A:
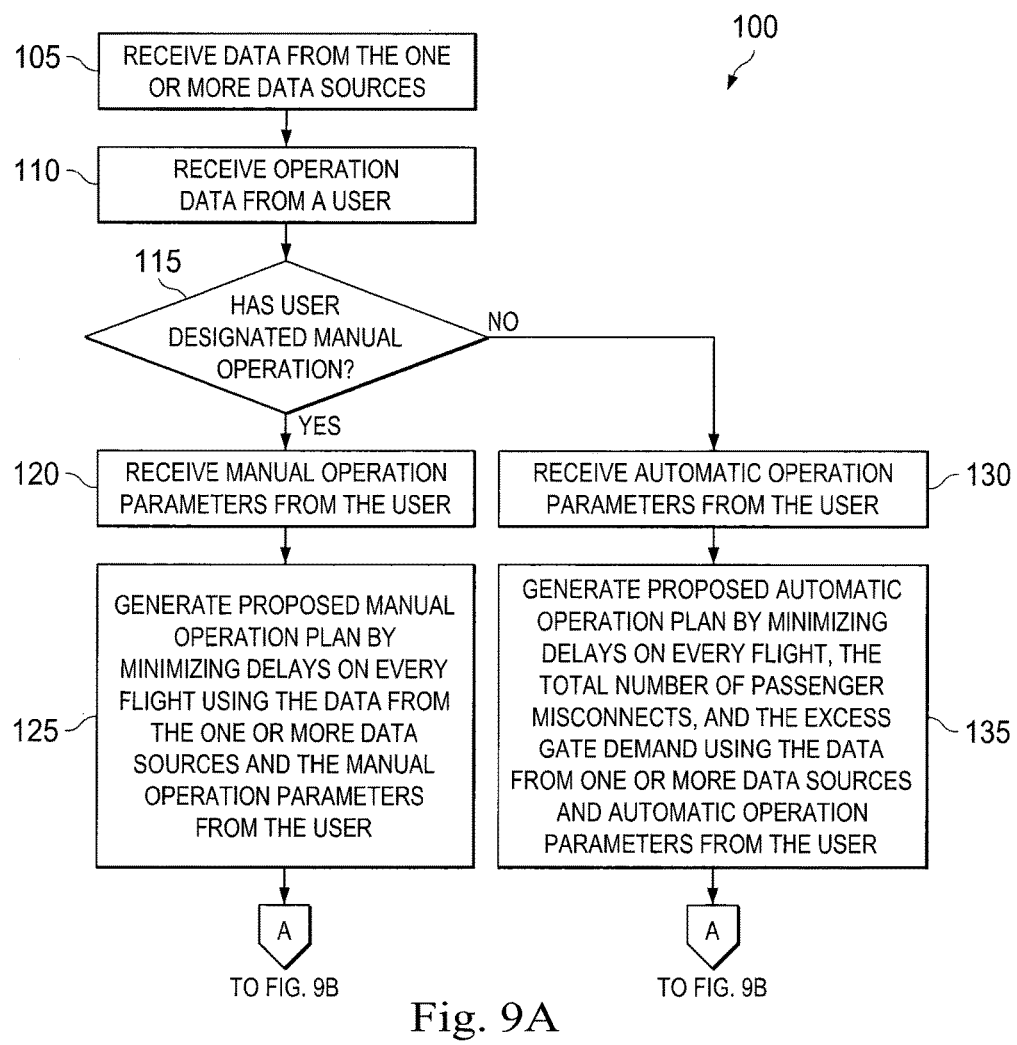
FIGS. 9A and 9B together form a flow chart illustration of a method of operating the system of FIG. 1, according to another exemplary embodiment.
Figure 9B:
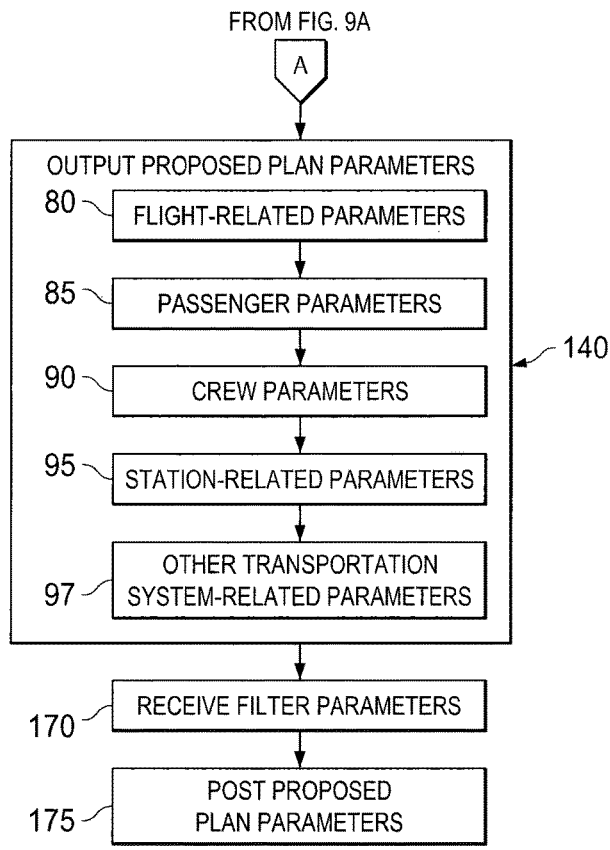

After reviewing the projected delays from the step 75, a user may be able to identify and respond to an ongoing or anticipated disruption at an airport or station of interest. In one embodiment, once it is determined by the system 10 that a response is required, the system 10 may develop a proposed manual operation plan or a proposed automatic operation plan, as shown in FIGS. 9A and 9B. That is, in one embodiment, after the method 60 is completed, the system 10 can begin the method illustrated in FIGS. 9A and 9B.

In an exemplary embodiment, as illustrated in FIGS. 9A and 9B, a method of operating the system 10 is generally referred to by the reference numeral 100. The method 100 includes receiving data from the plurality of data sources 40 in step 105, receiving operation data from a user at step 110, and determining whether the user has designated manual operation at step 115. If so, then manual operation parameters are received from the user at the step 120, and a proposed manual operation plan is generated by minimizing delays on every flight in the system using the data from the one or more data sources, and the manual operation parameters from the user at step 125. If it is determined at the step 115 that the user has not designated manual operation, then the automatic operation parameters are received from the user at step 130, and a proposed automatic operation plan is generated by minimizing delays on every flight, the total number of passenger misconnects, and the excess gate demand using the data from the one or more data sources and the automatic operation parameters from the user at step 135. The method 100 also includes outputting proposed plan parameters at step 140, filtering proposed plan parameters at step 170, and posting proposed plan parameters at step 175. The step 140 includes outputting the flight-related parameters 80, the station-related parameters 85, the crew parameters 90, the passenger parameters 95, and the other transportation system-related parameters 97. In one embodiment, the method 100 is associated with the recovery mode of the system 10. While in the recovery mode, the system 10 generates a proposed plan to manage disruptions. In one embodiment, the system 10 can create a proposed plan for not only one station, but can create a proposed plan for the entire transportation system. In several embodiments, the method 100 allows a user to develop and customize proposed plans to minimize excess gate demand, minimize operations beyond an airport closure time, minimize passenger misconnects, and minimize delays by recommending flight-specific delays.

The step 105 is substantially similar to the step 65 of the method 60, and therefore will not be discussed in detail.

In an exemplary embodiment, operation data is received from the user at the step 110 using an input chart 180 (shown in FIG. 10) that can be displayed on the input device 30c. In one embodiment, the input chart 180 has a selection box 185 that allows the user to designate between a manual operation of the system 10 or an automatic operation of the system 10.

As noted above, the system 10 determines whether the user has designated manual operation at the step 115. The system 10 uses the operation data received at the step 110 for this determination at the step 115.

As noted above, if the user has designated manual operation, then manual operation parameters are received from the user at the step 120. For example, and as shown in FIG. 10, the manual operation parameters received from the user at the step 120 can relate to violations, airline selection, plan type, delay start time and duration, and other parameters. In one embodiment, the input chart 180 has a selection box 190 that allows the user to designate that the proposed manual operation plan created at the step 125 should not include parameters that result in duty day violations. In one embodiment, the input chart 180 has a selection box 195 that allows the user to designate that the proposed plan created in the step 125 should not include parameters that result in curfew violations. In one embodiment, the input chart 180 has multiple selection boxes 200 that allow the user to designate an airline to which delays will be applied. In one embodiment, the input chart 180 has a column 205 of data parameter fields displayed on the input device 30c for scheduled hour, gate capacity, and desired delay. Each data parameter field in the column 205 labels and/or describes the content of a respective data parameter field in rows 205a, 205b, and 205c. In one embodiment, a delay parameter may be entered within a cell within the column 205c to signify a user's desired delay, in minutes, which corresponds to a scheduled hour. In one embodiment, the input chart 180 has a text box 210 that allows the user to enter the airport closure time, a text box 215 that allows the user to enter a departure threshold, which is a time period that prevents flights falling within the time period to receive a delay, a text box 220 that allows the user to enter a MOGT Inflation, which represents the additional ground time that each aircraft will receive within the proposed manual operation plan, and a text box 225 that allows the user to enter a departure delay adjustment, which adjusts the amount of delay for each scheduled hour. In one embodiment, the input chart 180 has a selection box 230 that allows the user to exclude flights by category, such as international markets, domestic markets, region, etc., exclude flights by flight, or exclude flights by default. The manual operation parameters received from the user are used to create a customized proposed manual operation plan by the system 10.

As shown in FIG. 9A, at the step 125, the system 10 generates a proposed manual operation plan by minimizing delays on every flight in the transportation system using the data from the one or more data sources 40 and the manual operation parameters from the user. In several embodiments, the system 10 generates a proposed manual operation plan, which ensures that a delay allocated to each flight is not more than what is dictated by the greater of 1) late arriving resources, such as crew and aircraft, 2) existing delays on the flight, such as published delays or ATC imposed delays, and 3) a user-specified delay on a flight. In an exemplary embodiment, the system 10 uses a mixed-integer program to create the proposed manual operation plan at the step 125. In one embodiment, the mixed-integer program used at the step 125 can be described as follows:

Minimize $$\sum_{f \in F} w_f^a + \sum_{f \in F} w_f^d \tag{8}$$

Subject to $$y_f - x_g \geq T_p, \; \forall f, p=(g,f) \in P^f \tag{9}$$

$$x_{f_1} - x_{f_2} \geq 0, \; \forall m, (f_1, f_2) \in \{\hat{x}_{f_1} \geq \hat{x}_{f_2}, f_1, f_2 \in F^m\} \tag{10}$$

$$x_f^{LB} \leq x_f, \; \forall f \in F \tag{11}$$

$$y_f^{LB} \leq y_f, \; \forall f \in F \tag{12}$$

$$w_f^d = y_f - \hat{y}_f, \; \forall f \in F \tag{13}$$

$$w_f^a = x_f - \hat{x}_f, \; \forall f \in F. \tag{14}$$

In several exemplary embodiments, the objective of function (8) is to minimize the departure delay and the arrival delay on each flight. Constraint set (9) ensures that a flight is not allowed to depart until all the resources required to operate the flight (crew and aircraft) are "ready" (arrived and ready to operate the flight). Constraint set (10) ensures that in every market (Origin-Destination combination), the arrival order of any two flights in that market is the same as the scheduled order of those two flights. That is, the arrival order is preserved. Constraint set (11) ensures that the arrival time of each flight is greater than the allowable arrival lower bound. The arrival lower bound is determined as the maximum of ($\hat{x}_f$, $x_f^L$, $x_f^P$, $P_f^a$). Constraint set (12) ensures that the departure time of each flight is greater than the allowable departure lower bound. The departure lower bound is determined as the maximum of ($\hat{y}_f$, $y_f^L$, $y_f^P$, $P_f^d$). Constraint set (13) computes a proposed manual departure delay for each flight, the proposed manual departure delay being the difference between the proposed manual departure time and the scheduled departure time. Constraint set (14) computes a proposed manual arrival delay for each flight, the proposed manual arrival delay being the difference between the proposed manual arrival time and the scheduled arrival time.

As shown in FIG. 11, at the step 140, the output device 30d outputs the proposed plan parameters using an output display 235. The parameters 145, 150, 155, 160, and 165 are substantially similar to the parameters 80, 85, 90, 95, and 97, respectively, of the system 60, and therefore will not be discussed in detail. In some embodiments, only one parameter from the proposed plan parameters 145, 150, 155, 160, and 165 will be displayed on the output display 235.

As shown in FIG. 9B, at the step 170, the system 10 receives filter parameters from the user. Filter parameters are selected by the user, using the output display 235, to filter the proposed plan parameters 145, 150, 155, 160, and 165. In one embodiment and as shown in FIG. 11, the output display 235 has a plurality of text boxes 240 that allow the user to input filter parameters to filter the parameters 145, 150, 155, 160, and 165. Filter parameters can be an upcoming time duration or minimum delay threshold.

As shown in FIG. 9B, at the step 175, the system 10 may post the proposed plan parameters 145, 150, 155, 160 to interested parties after receiving post instruction from the user, using the post button 245 on the output display 235 in FIG. 11. In several embodiments, the steps 105, 110, 115, 120, 125, 140, 170, and 175 are completed to use the manual operation mode of the system 10.

However, if at the step 115 the system 10 determines that the user did not designate manual operation, then the next step of the method 100 is not the step 120, as described above, but the step 130.

If the system 10 determines that the user did not designate manual operation, automatic operation parameters are received from the user at the step 130 using an input chart 250 (shown in FIG. 12). For example, and as shown in FIG. 12, the automatic operation parameters that can be received from the user at the step 130 can relate to violations, airline selection, plan type, delay start time and duration, and other parameters. In one embodiment, the input chart 250 has a selection box 255 that allows the user to designate that the proposed automatic operation plan created at the step 135 should only include parameters that do not result in duty day violations. In one embodiment, the input chart 250 has a selection box 260 that allows the user to designate that the proposed automatic operation plan created at the step 135 should only include parameters that do not result in curfew violations. In one embodiment, the input chart 250 has multiple selection boxes 265 that allow the user to designate an airline to which delays will be applied. In one embodiment, the input chart 250 has a column 270 of data parameter fields displayed on the input device 30c for scheduled hour, gate capacity, and diversion metering rate. Each data parameter field in the column 270 labels and/or describes the content of a respective data parameter field in rows 270a, 270b, and 270c. In one embodiment, a gate capacity parameter may be entered within a cell within the row 270b to signify how many gates have capacity at any scheduled hour. In one embodiment, a diversion metering rate parameter may be entered within a cell within the row 270c to reserve additional gate space (beyond what is entered in the gate capacity row 270b) for returning diversions. In one embodiment, the input chart 250 has a text box 275 that allows the user to enter the airport closure time, a text box 280 that allows the user to enter a departure threshold time period, which is a time period that prevents flights falling within the departure threshold time period to receive a delay, a text box 285 that allows the user to enter a MOGT Inflation, which represents a time period of additional ground time that each aircraft will receive within the system 10, and a text box 290 that allows the user to enter maximum total delay, which represents the maximum total delay that any flight will receive. In one embodiment, the input chart 250 has a selection box 295 that allows the user to exclude flights by category, such as international markets, domestic markets, region, etc., exclude flights by flight, or exclude flights by default.

As shown in FIG. 9A, at the step 135, the system 10 generates a proposed automatic operation plan by minimizing proposed automatic arrival delays and proposed automatic departure delays on every flight in the transportation system, minimizing the total number of passenger misconnects, and minimizing the excess gate demand using the data from the one or more data sources and the automatic operation parameters from the user. In several embodiments, the system 10 recommends optimal arrival delay and optimal departure delays on each flight while anticipating the effect of each recommended delay on every other flight in the system. At the step 135, the system 10 ensures that the proposed automatic arrival delay and the proposed automatic departure delay allocated to each flight is not more than what is dictated by the greater of 1) departure delay and arrival delay on every flight, 2) total number of passenger misconnects, and 3) excess gate demand (relative to the supply of gates). In an exemplary embodiment, the system 10 uses a mixed-integer program to create the proposed automatic operation plan at the step 135. In one embodiment, the mixed-integer program used at the step 135 can be described as follows:

Minimize $$\sum_{f \in F} w_f^a + \sum_{f \in F} w_f^d + \sum_{c \in C} w_c z_c + \sum_{i=1}^{N+1} \overline{C} \delta^i \qquad (15)$$

Subject to $$y_f - x_g \geq T_p, \quad \forall f, p = (g, f) \in P^f \qquad (16)$$

$$x_{f_1} - x_{f_2} \geq 0, \quad \forall m, (f_1, f_2) \in \{\hat{x}_{f_1} \geq \hat{x}_{f_2}, f_1, f_2 \in F^m\} \qquad (17)$$

$$x_f^{LB} \leq x_f, \quad \forall f \in F \qquad (18)$$

$$y_f^{LB} \leq y_f, \quad \forall f \in F \qquad (19)$$

$$w_f^d = y_f - \hat{y}_f, \quad \forall f \in F \qquad (20)$$

$$w_f^a = x_f - \hat{x}_f, \quad \forall f \in F \qquad (21)$$

$$M z_c \geq (x_g + T_c) - y_f, \quad \forall c = (g, f) \in C \qquad (22)$$

$$x_a = \sum_{i=1}^{N+1} s^i u_a^i + f_a, \quad \forall a \in A \qquad (23)$$

$$y_d = \sum_{i=1}^{N+1} s^i v_d^i + h_d, \quad \forall d \in D \qquad (24)$$

$$\sum_{i=1}^{N+1} u_a^i = 1, \quad \forall a \in A \qquad (25)$$

$$\sum_{i=1}^{N+1} v_d^i = 1, \quad \forall d \in D \qquad (26)$$

-continued $$\sum_{\substack{c=(g,f)\in P^f, \\ f\in F}} \left( \sum_{j=1}^{i} u_g^j + \sum_{j=i}^{N+1} v_f^j - 1 \right) - \delta^i + \lambda^i = Q^i, \quad (27)$$

$$\forall i = 1, \ldots, N+1$$

$$0 \le f_a \le 1 - \varepsilon, \quad \forall a \in A, d \in D \quad (28)$$

$$0 \le h_d \le 1 - \varepsilon, \quad \forall a \in A, d \in D \quad (29)$$

$$u_a^i \in \{0, 1\}, \quad \forall a \in A, i = 1, \ldots, N+1 \quad (30)$$

$$v_d^i \in \{0, 1\}, \quad \forall d \in D, i = 1, \ldots, N+1 \quad (31)$$

$$\sum_{i=1}^{N+1} u_f^i = 0, \quad \forall f \notin A \quad (32)$$

$$\sum_{i=1}^{N+1} v_f^i = 0, \quad \forall f \notin D \quad (33)$$

$$\delta^i \ge 0, \quad \forall i = 1, \ldots, N+1 \quad (34)$$

$$\lambda^i \ge 0, \quad \forall i = 1, \ldots, N+1 \quad (35)$$

In several embodiments, the objective of function (15) is to minimize a departure delay and an arrival delay on each flight, total number of passenger misconnects, and excess gate demand (relative to the supply of gates). Constraint set (16) ensures that a flight is not allowed to depart until all the resources required to operate the flight (crew and aircraft) are available or "ready" (arrived and ready to operate the flight). Constraint set (17) ensures that in every market (Origin-Destination combination), the arrival order of any two flights in that market is the same as the scheduled order of those two flights. That is, the arrival order is preserved. Constraint set (18) ensures that an arrival time of each flight is greater than the allowable arrival lower bound. The arrival lower bound is determined as the maximum of ($\hat{x}_f$, $x_f^L$, $x_f^P$). Constraint set (19) ensures that a departure time of each flight is greater than the departure allowable lower bound. The departure lower bound is determined as the maximum of ($\hat{y}_f$, $y_f^L$, $y_f^P$). Constraint set (20) computes a proposed automatic departure delay for each flight, the proposed automatic departure delay being the difference between the proposed automatic departure time and the scheduled departure time. Constraint set (21) computes a proposed automatic arrival delay for each flight, the proposed automatic arrival delay being the difference between the proposed automatic departure time and the scheduled departure time. Constraint set (22) determines whether or not the passengers are misconnecting a second leg of their connection. A passenger's travel itinerary to travel from one beginning location to an end location can comprise of a passenger connection with multiple legs. Constraint set (23) identifies a time interval within which an arrival time of each arrival falls. In some embodiments, this is done only for the arrivals at the station of interest. Constraint set (24) identifies a time interval within which a departure time of each arrival falls. In some embodiments, this is done only for the departures at the station of interest. Constraint set (25) ensures that the arrival time of each arrival at the station of interest belongs to only one time interval. Constraint set (26) ensures that the departure time of each departure at the station of interest belongs to only one time interval. Constraint set (27) computes the difference between the demand for gates in that interval and the supply of gates in the same interval at the station of interest and for every time interval. Constraint set (28) is a supporting constraint that ensures that the arrival time for each arrival at the station of interest is flagged to belong to the correct time interval. Constraint set (29) is a supporting constraint that ensures that the departure time for each departure at the station of interest is flagged to belong to the correct time interval. Constraint set (30) ensures that the supporting variables for arrival flights are binary. Constraint set (31) ensures that the supporting variables for departure flights are binary. Constraint set (32) ensures that flights that are not arriving at the station of interest do not contribute to the demand for gates at that station. Constraint set (33) ensures that flights that are not departing from the station of interest do not contribute to the demand for gates at that station. Constraint set (34) forces surplus variable to be positive. Constraint set (35) forces slack variable to be positive.

After the step 135, the next step is the step 140, followed by the steps 170 and 175, as described above.

In several embodiments, any step within the method 100 may be omitted. For example, the system 10 may not receive filter parameters at the step 170 before posting proposed plan parameters.

In one embodiment, the system 10 stores or saves proposed manual operation plans and proposed automatic operation plans for a duration of time for future retrieval and implementation. In several embodiments, the duration of time is 72 hours.

In one embodiment, the system 10 may be used to simulate a future disruption based on historical parameters or parameters provided by the user.

Figure 13:
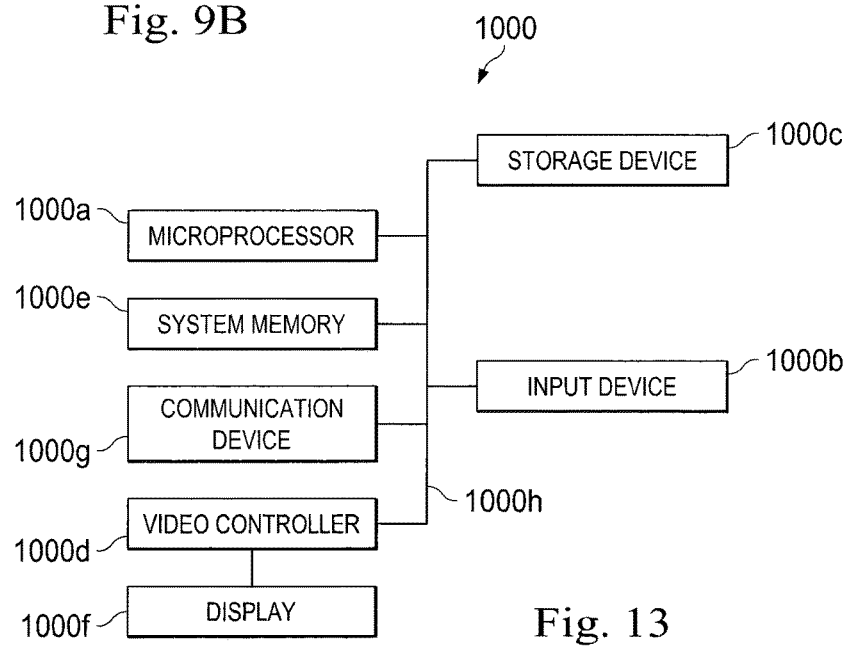
FIG. 13 is a diagrammatic illustration of a computing device for implementing one or more exemplary embodiments of the present disclosure, according to an exemplary embodiment.

In an exemplary embodiment, as illustrated in FIG. 13 with continuing reference to FIGS. 1, 2, 3, 4, 5, 6, 6A, 6B, 6C, 7, 8, 9A, 9B, 10, 11, and 12, an illustrative computing device 1000 for implementing one or more embodiments of one or more of the above-described networks, elements, methods and/or steps, and/or any combination thereof, is depicted. The computing device 1000 includes a processor 1000*a*, an input device 1000*b*, a storage device 1000*c*, a video controller 1000*d*, a system memory 1000*e*, a display 1000*f*, and a communication device 1000*g*, all of which are interconnected by one or more buses 1000*h*. In several exemplary embodiments, the storage device 1000*c* may include a floppy drive, hard drive, CD-ROM, optical drive, any other form of storage device and/or any combination thereof. In several exemplary embodiments, the storage device 1000*c* may include, and/or be capable of receiving, a floppy disk, CD-ROM, DVD-ROM, or any other form of computer readable medium that may contain executable instructions. In several exemplary embodiments, the communication device 1000*g* may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more of the functional module 14, the computer processor 15, the computer readable medium 20, the database 25, the remote user device 30, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, the functional module 14, the computer processor 15, the computer readable medium 20, the database 25, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 35, and/or one or more portions thereof, may be designed to work on any specific architecture. In an exemplary embodiment, one or more portions of the network 35 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 20, the system memory 1000e, and/or any combination thereof, may be executed by a processor to cause the processor to carry out or implement in whole or in part the operation of the system 10, one or more of the methods 60 and 100, and/or any combination thereof. In several exemplary embodiments, such a processor may include one or more of the computer processor 15, the processor 1000a, and/or any combination thereof. In several exemplary embodiments, such a processor may execute the plurality of instructions in connection with a virtual computer system.

A method has been described that includes receiving, using a computer, transportation-related data associated with a plurality of travel legs; and determining, using the computer, a projected departure delay and a projected arrival delay for each travel leg from the plurality of travel legs, wherein the projected departure delay is the difference between a projected departure time and a scheduled departure time of the travel leg, wherein the projected arrival delay is the difference between a projected arrival time and a scheduled arrival time of the travel leg, and wherein each of the projected departure delay and the projected arrival delay is not more than the greater of: a resources delay relating to a delay necessary to provide the travel leg with resources required for the departure of the travel leg, and an existing delay associated with the travel leg; wherein determining the projected departure delay and the projected arrival delay for each travel leg from the plurality of travel legs comprises minimizing the sum of the projected departure delays and the projected arrival delays while: ensuring that each travel leg departs a departure location with the resources required for the departure of the travel leg; and preserving an arrival order of two or more of the travel legs at an arrival location. In an exemplary embodiment, the sum of the projected departure delays and the projected arrival delays are minimized while: ensuring that an arrival time of each travel leg is later than an allowable arrival lower bound time; and ensuring that a departure time of each travel leg is later than an allowable departure lower bound time. In an exemplary embodiment, the method also includes outputting parameters associated with the projected departure delays and the projected arrival delays. In an exemplary embodiment, the method also includes receiving, using the computer, manual operation parameters, the manual operation parameters including a user-specified delay on a travel leg from the plurality of travel legs; and generating, using the computer, a proposed manual plan having a projected manual departure delay and a projected manual arrival delay for each travel leg from the plurality of travel legs, wherein the projected manual departure delay is the difference between a projected manual departure time and a scheduled departure time of the travel leg, wherein the projected manual arrival delay is the difference between a projected manual arrival time and a scheduled arrival time of the travel leg, and wherein each of the projected manual departure delay and the projected manual arrival delay is not more than the greater of: the resources delay, the existing delay associated with the travel leg, and the user-specified delay on the travel leg; wherein generating the projected manual departure delay and the projected manual arrival delay for each travel leg from the plurality of travel legs comprises minimizing the sum of the projected manual departure delays and the projected manual arrival delays while: ensuring that each travel leg departs a departure location with the resources required for the departure of the travel leg; and preserving an arrival order of two or more of the travel legs at an arrival location. In an exemplary embodiment, the transportation-related data comprises the resources delay; the existing delay associated with the travel leg; the arrival order of the two or more travel legs at the arrival location; the scheduled arrival time for each travel leg; and the scheduled departure time for each travel leg. In an exemplary embodiment, the method also includes receiving, using the computer, automatic operation parameters; and generating, using the computer, a proposed automatic plan having a projected automatic departure delay and a projected automatic arrival delay for each travel leg from the plurality of travel legs, wherein the projected automatic departure delay is the difference between a projected automatic departure time and a scheduled departure time of the travel leg, wherein the projected automatic arrival delay is the difference between a projected automatic arrival time and a scheduled arrival time of the travel leg; wherein generating the projected automatic departure delay and the projected automatic arrival delay for each travel leg from the plurality of travel legs comprises minimizing the sum of the projected automatic departure delays and the projected automatic arrival delays, the number of passenger misconnects, and excess gate demand, while: ensuring that each travel leg departs a departure location with the resources required for the departure of the travel leg; and preserving an arrival order of two or more of the travel legs at an arrival location. In an exemplary embodiment, the travel leg is an airline flight.

A method has been described that includes receiving, using a computer, data associated with a plurality of travel legs; identifying, using the computer: a resources delay relating to a delay necessary to provide a travel leg from the plurality of travel legs with resources required for the departure of the travel leg, and an existing delay associated with the travel leg; determining, using the computer, a projected arrival delay and a projected departure delay based on the resources delay and the existing delay; outputting, using the computer, parameters relating to the projected arrival delay and the projected departure delay; receiving, using the computer, operation parameters; and generating, using the computer, a proposed operation plan using the projected arrival delay, the projected departure delay, and the operation parameters. In an exemplary embodiment, one or more of the operation parameters are manually inputted. In an exemplary embodiment, one or more of the operation parameters are automatically generated.

An apparatus has been described that includes a non-transitory computer readable medium; and a plurality of instructions stored on the non-transitory computer readable medium and executable by one or more processors, the plurality of instructions comprising: instructions that cause the one or more processors to receive transportation-related data associated with a plurality of travel legs; and instructions that cause the one or more processors to determine a projected departure delay and a projected arrival delay for each travel leg from the plurality of travel legs; wherein the projected departure delay is the difference between a projected departure time and a scheduled departure time of the travel leg, wherein the projected arrival delay is the difference between a projected arrival time and a scheduled arrival time of the travel leg, and wherein each of the projected departure delay and the projected arrival delay is not more than the greater of: a resources delay relating to a delay necessary to provide the travel leg with resources required for the departure of the travel leg, and an existing delay associated with the travel leg; wherein the instructions that cause the one or more processors to generate the projected departure delay and the projected arrival delay for each travel leg from the plurality of travel legs comprise instructions that cause the one or more processors to minimize the sum of the projected departure delays and the projected arrival delays while: ensuring that each travel leg departs a departure location with the resources required for the departure of the travel leg; and preserving an arrival order of two or more of the travel legs at an arrival location. In an exemplary embodiment, the sum of the projected departure delays and the projected arrival delays are minimized while: ensuring that an arrival time of each travel leg is later than an allowable arrival lower bound time; and ensuring that a departure time of each travel leg is later than an allowable departure lower bound time. In an exemplary embodiment, the plurality of instructions further comprises: instructions that cause the one or more processors to output parameters associated with the projected departure delays and the projected arrival delays. In an exemplary embodiment, the plurality of instructions further comprises: instructions that cause the one or more processors to receive manual operation parameters, the manual operation parameters including a user-specified delay on a travel leg from the plurality of travel legs; and instructions that cause the one or more processors to generate a proposed manual plan having a projected manual departure delay and a projected manual arrival delay for each travel leg from the plurality of travel legs, wherein the projected manual departure delay is the difference between a projected manual departure time and a scheduled departure time of the travel leg, wherein the projected manual arrival delay is the difference between a projected manual arrival time and a scheduled arrival time of the travel leg, and wherein each of the projected manual departure delay and the projected manual arrival delay is not more than the greater of: the resources delay, the existing delay associated with the travel leg, and the user-specified delay on the travel leg; wherein instructions that cause the one or more processors to generate the projected manual departure delay and the projected manual arrival delay for each travel leg from the plurality of travel legs comprise instructions that cause the one or more processors to minimize the sum of the projected manual departure delays and the projected manual arrival delays while: ensuring that each travel leg departs a departure location with the resources required for the departure of the travel leg; and preserving an arrival order of two or more of the travel legs at an arrival location. In an exemplary embodiment, the transportation-related data comprises the resources delay; the existing delay associated with the travel leg; the arrival order of two or more of the travel legs at an arrival location; the scheduled arrival time for each travel leg; and the scheduled departure time for each travel leg. In an exemplary embodiment, the apparatus also includes instructions that cause the one or more processors to receive automatic operation parameters; and instructions that cause the one or more processors to generate a proposed automatic plan having a projected automatic departure delay and a projected automatic arrival delay for each travel leg from the plurality of travel legs, wherein the projected automatic departure delay is the difference between a projected automatic departure time and a scheduled departure time of the travel leg, wherein the projected automatic arrival delay is the difference between a projected automatic arrival time and a scheduled arrival time of the travel leg; wherein instructions that cause the one or more processors to generate the projected automatic departure delay and the projected automatic arrival delay for each travel leg from the plurality of travel legs comprise instructions that cause the one or more processors to minimize the sum of the projected automatic departure delays and the projected automatic arrival delays, the number of passenger misconnects, and excess gate demand, while: ensuring that each travel leg departs a departure location with the resources required for the departure of the travel leg; and preserving an arrival order of two or more of the travel legs at an arrival location. In an exemplary embodiment, the travel leg is an airline flight.

An apparatus has been described that includes a non-transitory computer readable medium; and a plurality of instructions stored on the non-transitory computer readable medium and executable by one or more processors, the plurality of instructions comprising: instructions that cause the one or more processors to receive data associated with a plurality of travel legs; instructions that cause the one or more processors to identify: a resources delay relating to a delay necessary to provide a travel leg from the plurality of travel legs with resources required for the departure of the travel leg, and an existing delay associated with the travel leg; instructions that cause the one or more processors to determine a projected arrival delay and a projected departure delay based on the resources delay and the existing delay; instructions that cause the one or more processors to output parameters relating to the projected arrival delay and the projected departure delay; instructions that cause the one or more processors to receive operation parameters; and instructions that cause the one or more processors to generate a proposed operation plan using the projected arrival delay, the projected departure delay, and the operation parameters. In an exemplary embodiment, one or more of the operation parameters are manually inputted. In an exemplary embodiment, one or more of the operation parameters are automatically generated.

It is understood that variations may be made in the foregoing without departing from the scope of the disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping transaction before, during or after which a ship travels from one port to another port and, in some case, on to one or more other ports. In an exemplary embodiment, aspects of the present disclosure are readily applicable and/or readily adaptable to a trucking transaction before, during or after which a truck travels from one location to another location and, in some case, on to one or more other locations. In an exemplary embodiment, aspects of the present disclosure are readily applicable and/or readily adaptable to a rail transaction before, during or after which a train travels from one city or station to another city or station and, in some cases, on to one or more other cities or stations. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method for proposing an intentional delay for at least one travel leg from a plurality of travel legs of a transportation system, the method comprising:
  receiving, using a computer, transportation-related data associated with the plurality of travel legs from at least one of:
    a dispatch environmental control computer system;
    an enhanced reservation computer system;
    an off-schedule operations computer system;
    a flight operating computer system; and
    an aircraft communication addressing and reporting computer system;

analyzing, using the computer, the transportation-related data to generate a projected departure delay and a projected arrival delay for each travel leg from the plurality of travel legs,
  wherein the projected departure delay is the difference between a projected departure time and a scheduled departure time of the travel leg,
  wherein the projected arrival delay is the difference between a projected arrival time and a scheduled arrival time of the travel leg,
  wherein each of the projected departure delay and the projected arrival delay is not more than the greater of:
    a resources delay relating to a delay necessary to provide the travel leg with resources required for the departure of the travel leg, and
    an existing delay associated with the travel leg; and
  wherein determining the projected departure delay and the projected arrival delay for each travel leg from the plurality of travel legs comprises minimizing the sum of the projected departure delays and the projected arrival delays while:
    ensuring that each travel leg departs a departure location with the resources required for the departure of the travel leg; and
    preserving an arrival order of two or more of the travel legs at an arrival location;
determining, using the computer, a projected excess gate demand for a plurality of gates within the transportation system and a projected number of passenger misconnects based on the projected departure delays and the projected arrival delays;
outputting on a graphical user interface of the computer a first interface displaying the projected excess gate demand for the plurality of gates at a first location within the transportation system and the projected number of passenger misconnects, comprising:
  displaying, in a gate demand display region of the first interface, a plurality of bars representing projected demand for the plurality of gates at the first location over a period of time, wherein a width of each bar—along a time axis—represents a time period within the period of time, and a height of each bar—along a demand axis that is perpendicular to the time axis-represents the total projected demand for gates in that time period;
  displaying, in the gate demand display region of the first interface, a first line imposed over the plurality of bars, wherein the first line represents a scheduled demand for the plurality of gates at the first location for each time period within the period of time;
  displaying, in the gate demand display region of the first interface, a second line—extending parallel to the time axis—positioned perpendicular to the demand axis at a position representing a physical number of gates that are available at the first location; and
  displaying, in the gate demand display region of the graphical user interface, a third line—extending parallel to the demand axis—positioned perpendicular to the time axis at a position representing the current time;
  wherein a projected excess gate demand is depicted when a height of any bar extends over the second line;
generating, in response to the projected excess gate demand and the projected number of passenger misconnects illustrated on the first interface, either: a first recommended plan having a first recommended projected departure delay and a first recommended projected arrival delay for each travel leg from the plurality of travel legs; or a second recommended proposed plan having a second recommended projected departure delay and a second recommended projected arrival delay for each travel leg from the plurality of travel legs;
wherein generating the first recommended plan having the first recommended projected departure delay and the first recommended projected arrival delay for each travel leg from the plurality of travel legs comprises:
  displaying a second interface on the graphical user interface, wherein the second interface comprises:
    a first input field configured to receive, for each time period within the period of time, a user-specified delay on a travel leg from the plurality of travel legs; and
    a second input field configured to receive an airport closure time;
  receiving first operation parameters from a user via the second interface, the first operation parameters including:
    a user-specified delay on a travel leg from the plurality of travel legs for a time period; and
    the airport closure time;
    wherein the first recommended projected departure delay is the difference between a first recommended projected departure time and the scheduled departure time of the travel leg,
    wherein the first recommended projected arrival delay is the difference between a first recommended projected arrival time and the scheduled arrival time of the travel leg, and
    wherein each of the first recommended projected departure delay and the first recommended projected arrival delay is not more than the greater of:
      the resources delay,
      the existing delay associated with the travel leg, and
      the user-specified delay on the travel leg; and
  minimizing the sum of the first recommended projected departure delays and the first recommended projected arrival delays while:
    ensuring that each travel leg departs the departure location with the resources required for the departure of the travel leg; and
    preserving the arrival order of two or more of the travel legs at the arrival location; and
wherein generating the second recommended proposed plan having the second recommended projected departure delay and the second recommended projected arrival delay for each travel leg from the plurality of travel legs comprises:
  receiving, using the computer, second operation parameters from the user, the second operation parameters including the airport closure time;
    wherein the second recommended projected departure delay is the difference between a second recommended projected departure time and the scheduled departure time of the travel leg, and
    wherein the second recommended projected arrival delay is the difference between a second recommended projected arrival time and the scheduled arrival time of the travel leg; and minimizing the sum of the second recommended projected departure delays, the second recommended projected arrival delays, the projected number of passenger misconnects, and the projected excess gate demand, while:

ensuring that each travel leg departs the departure location with the resources required for the departure of the travel leg; and preserving the arrival order of two or more of the travel legs at the arrival location;

outputting on a third interface on the graphical user interface at least one of the first recommended projected departure delay, the first recommended projected arrival delay, the second recommended projected departure delay, and the second recommended projected arrival delay as the proposed intentional delay that reduces at least one of the projected excess gate demand and the projected number of passenger misconnects; and that minimizes operations beyond the airport closure time; and implementing the proposed intentional delay to transform a state of an aircraft associated with one of the plurality of travel legs to a delayed state.

2. The method of claim 1 wherein the sum of the projected departure delays and the projected arrival delays are minimized while:

ensuring that an arrival time of each travel leg is later than an allowable arrival lower bound time; and ensuring that a departure time of each travel leg is later than an allowable departure lower bound time.

3. The method of claim 1, wherein the transportation-related data comprises the resources delay; the existing delay associated with the travel leg; the arrival order of the two or more travel legs at the arrival location; the scheduled arrival time for each travel leg; and the scheduled departure time for each travel leg.

4. The method of claim 1, wherein the travel leg is an airline flight.

5. An apparatus for proposing an intentional delay for at least one travel leg from a plurality of travel legs of a transportation system, the apparatus comprising:

a non-transitory computer readable medium; and a plurality of instructions stored on the non-transitory computer readable medium and executable by one or more processors, the plurality of instructions comprising:

instructions that cause the one or more processors to receive transportation-related data associated with a plurality of travel legs from at least one of:
a dispatch environmental control computer system;
an enhanced reservation computer system;
an off-schedule operations computer system;
a flight operating computer system; and
an aircraft communication addressing and reporting computer system;

instructions that cause the one or more processors to analyze the transportation-related data to generate a projected departure delay and a projected arrival delay for each travel leg from the plurality of travel legs;

wherein the projected departure delay is the difference between a projected departure time and a scheduled departure time of the travel leg, wherein the projected arrival delay is the difference between a projected arrival time and a scheduled arrival time of the travel leg, wherein each of the projected departure delay and the projected arrival delay is not more than the greater of:

a resources delay relating to a delay necessary to provide the travel leg with resources required for the departure of the travel leg, and an existing delay associated with the travel leg; and wherein the instructions that cause the one or more processors to generate the projected departure delay and the projected arrival delay for each travel leg from the plurality of travel legs comprise instructions that cause the one or more processors to minimize the sum of the projected departure delays and the projected arrival delays while:

ensuring that each travel leg departs a departure location with the resources required for the departure of the travel leg; and preserving an arrival order of two or more of the travel legs at an arrival location;

instructions that cause the one or more processors to determine a projected excess gate demand for a plurality of gates within the transportation system and a projected number of passenger misconnects based on the projected departure delays and the projected arrival delays;

instructions that cause the one or more processors to output on a graphical user interface a first interface displaying the projected excess gate demand for the plurality of gates at a first location within the transportation system and the projected number of passenger misconnects, comprising:

instructions that cause the one or more processors to display, in a gate demand display region of the first interface, a plurality of bars representing projected demand for the plurality of gates at the first location over a period of time, wherein a width of each bar—along a time axis—represents a time period within the period of time, and a height of each bar—along a demand axis that is perpendicular to the time axis-represents the total projected demand for gates in that time period;

instructions that cause the one or more processors to display, in the gate demand display region of the first interface, a first line imposed over the plurality of bars, wherein the first line represents a scheduled demand for the plurality of gates at the first location for each time period within the period of time;

instructions that cause the one or more processors to display, in the gate demand display region of the first interface, a second line—extending parallel to the time axis—positioned perpendicular to the demand axis at a position representing a physical number of gates that are available at the first location; and instructions that cause the one or more processors to display, in the gate demand display region of the graphical user interface, a third line—extending parallel to the demand axis—positioned perpendicular to the time axis at a position representing the current time;

wherein a projected excess gate demand is depicted when a height of any bar extends over the second line;

instructions that cause the one or more processors to generate, in response to the determination of the projected excess gate demand and the projected number of passenger misconnects illustrated on the first interface, either: a first recommended plan having first recommended projected departure delay and a first recommended projected arrival delay for each travel leg from the plurality of travel legs; or a second recommended proposed plan having a second recommended projected departure delay and a second recommended projected arrival delay for each travel leg from the plurality of travel legs;

wherein instructions to generate the first recommended plan having the first recommended projected departure delay and the first recommended projected arrival delay for each travel leg from the plurality of travel legs further comprises:

instructions that cause the one or more processors to display a second interface on the graphical user interface, wherein
the second interface comprises:
a first input field configured to receive, for each time period within the period of time, a user-specified delay on a travel leg from the plurality of travel legs; and
a second input field configured to receive an airport closure time;

instructions that cause the one or more processors to receive via the second interface first operation parameters from a user, the first operation parameters including:
a user-specified delay on a travel leg from the plurality of travel legs for a time period; and
the airport closure time;
wherein the first recommended projected departure delay is the difference between a first recommended projected departure time and the scheduled departure time of the travel leg,
wherein the first recommended projected arrival delay is the difference between a first recommended projected arrival time and the scheduled arrival time of the travel leg, and
wherein each of the first recommended projected departure delay and the first recommended projected arrival delay is not more than the greater of:
the resources delay,
the existing delay associated with the travel leg, and
the user-specified delay on the travel leg; and instructions that cause the one or more processors to minimize the sum of the first recommended projected departure delays and the first recommended projected arrival delays while:
ensuring that each travel leg departs the departure location with the resources required for the departure of the travel leg; and
preserving the arrival order of two or more of the travel legs at the arrival location; and wherein instructions that cause the one or more processors to generate the second recommended proposed plan having the second recommended projected departure delay and the second recommended projected arrival delay for each travel leg from the plurality of travel legs comprises:

instructions that cause the one or more processors to receive second operation parameters from the user, the second operation parameters including the airport closure time;
wherein second recommended projected departure delay is the difference between a second recommended projected departure time and the scheduled departure time of the travel leg, and
wherein the second recommended projected arrival delay is the difference between second recommended projected arrival time and the scheduled arrival time of the travel leg; and instructions that cause the one or more processors to minimize the sum of the second recommended projected departure delays, the second recommended projected arrival delays, while:
ensuring that each travel leg departs the departure location with the resources required for the departure of the travel leg; and
preserving an arrival order of two or more of the travel legs at the arrival location;

instructions that cause the one or more processors to output on a third interface on the graphical user interface at least one of the first recommended projected departure delay, the first recommended projected arrival delay, the second recommended projected departure delay, and the second recommended projected arrival delay as the proposed intentional delay that reduces at least one of the projected excess gate demand and the projected number of passenger misconnects; and that minimizes operations beyond the airport closure time;
and
instructions that cause the one or more processors to implement the proposed intentional delay to transform a state of an aircraft associated with one of the plurality of travel legs to a delayed state.

6. The apparatus of claim 5, wherein the sum of the projected departure delays and the projected arrival delays are minimized while:
ensuring that an arrival time of each travel leg is later than an allowable arrival lower bound time; and
ensuring that a departure time of each travel leg is later than an allowable departure lower bound time.

7. The apparatus of claim 5, wherein the transportation-related data comprises the resources delay; the existing delay associated with the travel leg; the arrival order of two or more of the travel legs at the arrival location; the scheduled arrival time for each travel leg; and the scheduled departure time for each travel leg.

8. The apparatus of claim 5, wherein the travel leg is an airline flight.

9. An apparatus for proposing an intentional delay for at least one travel leg from a plurality of travel legs of a transportation system, the apparatus comprising:
a non-transitory computer readable medium; and
a plurality of instructions stored on the non-transitory computer readable medium and executable by one or more processors, the plurality of instructions comprising:
instructions that cause the one or more processors to receive transportation-related data associated with a plurality of travel legs from at least one of:
a dispatch environmental control computer system;
an enhanced reservation computer system;

an off-schedule operations computer system;
a flight operating computer system; and
an aircraft communication addressing and reporting computer system;
instructions that cause the one or more processors to analyze the transportation-related data to generate a projected departure delay and a projected arrival delay for each travel leg from the plurality of travel legs;
  wherein the projected departure delay is the difference between a projected departure time and a scheduled departure time of the travel leg,
  wherein the projected arrival delay is the difference between a projected arrival time and a scheduled arrival time of the travel leg,
  wherein each of the projected departure delay and the projected arrival delay is not more than the greater of:
  a resources delay relating to a delay necessary to provide the travel leg with resources required for the departure of the travel leg, and
  an existing delay associated with the travel leg; and
  wherein the instructions that cause the one or more processors to generate the projected departure delay and the projected arrival delay for each travel leg from the plurality of travel legs comprise instructions that cause the one or more processors to minimize the sum of the projected departure delays and the projected arrival delays while:
  ensuring that each travel leg departs a departure location with the resources required for the departure of the travel leg; and
  preserving an arrival order of two or more of the travel legs at an arrival location;
instructions that cause the one or more processors to determine a projected excess gate demand for a plurality of gates within the transportation system and a projected number of passenger misconnects based on the projected departure delays and the projected arrival delays;
instructions that cause the one or more processors to output on a graphical user interface a first interface displaying the projected excess gate demand for the plurality of gates at a first location within the transportation system and the projected number of passenger misconnects, comprising:
  instructions that cause the one or more processors to display, in a gate demand display region of the first interface, a plurality of bars representing projected demand for the plurality of gates at the first location over a period of time, wherein a width of each bar—along a time axis—represents a time period within the period of time, and a height of each bar—along a demand axis that is perpendicular to the time axis—represents the total projected demand for gates in that time period;
  instructions that cause the one or more processors to display, in the gate demand display region of the first interface, a first line imposed over the plurality of bars, wherein the first line represents a scheduled demand for the plurality of gates at the first location for each time period within the period of time;
  instructions that cause the one or more processors to display, in the gate demand display region of the first interface, a second line—extending parallel to the time axis—positioned perpendicular to the demand axis at a position representing a physical number of gates that are available at the first location; and
  instructions that cause the one or more processors to display, in the gate demand display region of the graphical user interface, a third line—extending parallel to the demand axis—positioned perpendicular to the time axis at a position representing the current time;
  wherein a projected excess gate demand is depicted when a height of any bar extends over the second line;
instructions that cause the one or more processors to generate, in response to the projected excess gate demand and the projected number of passenger misconnects illustrated on the first interface, either: a first recommended plan having first recommended projected departure delay and a first recommended projected arrival delay for each travel leg from the plurality of travel legs; or a second recommended proposed plan having a second recommended projected departure delay and a second recommended projected arrival delay for each travel leg from the plurality of travel legs;
  wherein instructions to generate the first recommended plan having the first recommended projected departure delay and the first recommended projected arrival delay for each travel leg from the plurality of travel legs further comprises:
  instructions that cause the one or more processors to display a second interface on the graphical user interface, wherein the second interface comprises:
    a first input field configured to receive, for each time period within the period of time, a user-specified delay on a travel leg from the plurality of travel legs; and
    a second input field configured to receive an airport closure time;
  instructions that cause the one or more processors to receive via the second interface first operation parameters from a user, the first operation parameters including:
    a user-specified delay on a travel leg from the plurality of travel legs for a time period; and
    the airport closure time;
  wherein the first recommended projected departure delay is the difference between a first recommended projected departure time and the scheduled departure time of the travel leg,
  wherein the first recommended projected arrival delay is the difference between a first recommended projected arrival time and the scheduled arrival time of the travel leg, and
  wherein each of the first recommended projected departure delay and the first recommended projected arrival delay is not more than the greater of:
    the resources delay,
    the existing delay associated with the travel leg, and
    the user-specified delay on the travel leg; and
  instructions that cause the one or more processors to minimize the sum of the first recommended projected departure delays and the first recommended projected arrival delays while:

ensuring that each travel leg departs the departure location with the resources required for the departure of the travel leg; and
preserving the arrival order of two or more of the travel legs at the arrival location; and
wherein instructions that cause the one or more processors to generate the second recommended proposed plan having the second recommended projected departure delay and the second recommended projected arrival delay for each travel leg from the plurality of travel legs comprises:
instructions that cause the one or more processors to receive second operation parameters from the user, the second operation parameters including the airport closure time;
wherein second recommended projected departure delay is the difference between a second recommended projected departure time and the scheduled departure time of the travel leg, and
wherein the second recommended projected arrival delay is the difference between second recommended projected arrival time and the scheduled arrival time of the travel leg; and
instructions that cause the one or more processors to minimize the sum of the second recommended projected departure delays, the second recommended projected arrival delays, while:
ensuring that each travel leg departs the departure location with the resources required for the departure of the travel leg; and
preserving an arrival order of two or more of the travel legs at the arrival location;
instructions that cause the one or more processors to output on a third interface on the graphical user interface at least one of the first recommended projected departure delay, the first recommended projected arrival delay, the second recommended projected departure delay, and the second recommended projected arrival delay as the proposed intentional delay that reduces at least one of the projected excess gate demand and the projected number of passenger misconnects; and that minimizes operations beyond the airport closure time;
and
instructions that cause the one or more processors to implement the proposed intentional delay to transform a state of an aircraft associated with one of the plurality of travel legs to a delayed state;
wherein the travel leg is an airline flight; and
wherein the instructions that cause the one or more processors to generate the projected departure delay and the projected arrival delay for each travel leg from the plurality of travel legs comprise instructions that cause the one or more processors to execute a mixed integer program comprising a problem represented by:
minimize $$\sum_{f \in F} w_f^a + \sum_{f \in F} w_f^d \quad (1)$$

subject to:

$$y_f - x_g \geq T_p, \ \forall f \in F, \ p=(g,f) \in P^f \quad (2)$$

$$x_{f_1} - x_{f_2} \geq 0, \ \forall m, (f_1, f_2) \in \{\hat{x}_{f_1} \geq \hat{x}_{f_2}, f_1, f_2 \in F^m\} \quad (3)$$

$$x_f^{LB} \leq x_f \ \forall f \in F \quad (4)$$

$$x_f^{LB} \leq y_f \ \forall f \in F \quad (5)$$

$$x_f^d = y_f - \hat{y}_f \ \forall f \in F \quad (6)$$

$$w_f^a = x_f - \hat{x}_f \ \forall f \in F \quad (7)$$

where F is a set of all flights for an airline for a predefined time period, typically a day and f∈F;
where A is a set of arrival flights 'a' arriving at a station of interest; a∈A∈F;
where D is a set of departure flights 'd' departing from a station of interest; d∈D∈F;
where M is a set of all markets 'm' (origin-destination pairs); m∈M;
where $F^m$ is a set of flights 'f' which are in the same market 'm';
where C is a set of passenger connections 'c' where c=(g, f) where 'g' is a first flight of a passenger connection and 'f' is a second flight;
where $P^f$ is a set of dependencies p=(g, f) where 'g' is a flight that provides a flight with resources required for the departure of the flight 'f', with g∈F and f∈F;
where $\hat{x}_f$ is a scheduled arrival time of the flight 'f';
where $x_f^{LB}$ is the earliest time that the flight 'f' can arrive;
where $\hat{y}_f^{LB}$ is a scheduled departure time of the flight 'f';
where $y_f^{LB}$ is an earliest time that the flight 'f' can depart;
where $x_f$ is an arrival time of the flight f∈F;
where $y_f$ is a departure time of the flight f∈F;
where $w_f^a$ is an arrival delay on the flight 'f' beyond the scheduled arrival time; and
where $w_f^d$ is a departure delay on the flight 'f' beyond the scheduled departure time.

* * * * *